United States Patent [19]

Akamatsu

[11] 4,321,518
[45] Mar. 23, 1982

[54] INDUCTOR TYPE SYNCHRONOUS MOTOR DRIVING SYSTEM FOR MINUTE CONTROL OF THE POSITION AND THE ROTATION ANGLE OF THE MOTOR

[75] Inventor: Masahiko Akamatsu, Amagasaki, Japan

[73] Assignee: Mitsubishi Denki Kabushiki Kaisha, Tokyo, Japan

[21] Appl. No.: 909,493

[22] Filed: May 25, 1978

Related U.S. Application Data

[62] Division of Ser. No. 671,710, Mar. 29, 1976, Pat. No. 4,134,055.

[30] Foreign Application Priority Data

Mar. 28, 1975 [JP] Japan .................................. 50-38110

[51] Int. Cl.³ .......................... H02P 1/46; H02P 5/36; H02K 37/00
[52] U.S. Cl. .................................... 318/696; 318/701; 318/810; 310/49 R
[58] Field of Search ............... 318/138, 696, 341, 810, 318/701; 310/49, 162–164

[56] References Cited

U.S. PATENT DOCUMENTS

| | | | |
|---|---|---|---|
| 3,686,553 | 8/1972 | Broadway et al. | 318/701 |
| 3,795,854 | 3/1974 | Kobayashi et al. | 318/696 |
| 3,809,990 | 5/1974 | Kuo et al. | 318/696 |
| 3,826,966 | 7/1974 | Nagasaka et al. | 318/696 |
| 3,875,437 | 4/1975 | Hara et al. | 310/49 R |
| 4,000,452 | 12/1976 | Heine | 318/696 |
| 4,029,977 | 6/1977 | Chai et al. | 310/49 R |
| 4,039,908 | 8/1977 | Maeder | 318/701 |
| 4,134,055 | 1/1979 | Akamatsu | 318/696 |

Primary Examiner—J. V. Truhe
Assistant Examiner—Richard M. Moose
Attorney, Agent, or Firm—Oblon, Fisher, Spivak, McClelland & Maier

[57] ABSTRACT

A system for driving an inductor type synchronous motor for minute control thereof which includes an inductor type synchronous motor having a circuit for driving m phases of driving windings and first magnetic teeth. A second group of magnetic teeth is provided facing the first group of magnetic teeth. Apparatus is provided for feeding electric current from a DC power source to the driving windings of the respective phases. The driving winding for one phase intersects the flux of a partial set of first magnetic teeth or at least two magnetic teeth to provide a flux-interlink. A group of solid state switches are interposed between the source for producing the electric current and the driving windings of the respective phases. A distribution pattern generator generates patterns in response to a command signal and controls the on-off states of the solid-state switches with the noted patterns to thereby form the electric current into trigonometric-functional-patterns. The minute control characterized with an electrical resolution number R, per electrical angle $2\pi$ ($2\pi$ being one fundamental cycle) of the apparatus for feeding electric current, is equal to or larger than $3m$ per electrical cycle. The minute control is thereby determined to be stepless.

27 Claims, 28 Drawing Figures

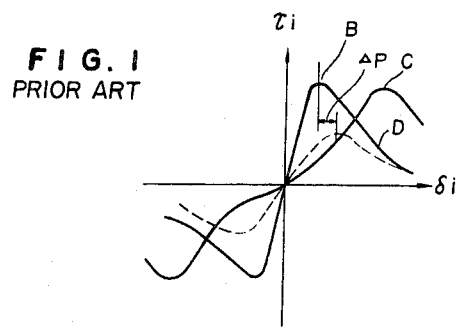
FIG. 1 PRIOR ART
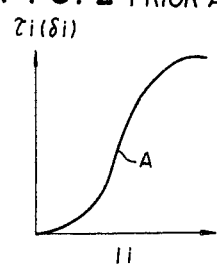
FIG. 2 PRIOR ART
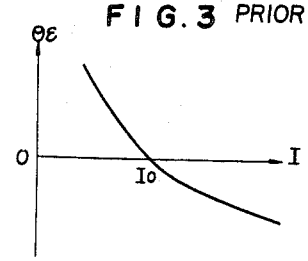
FIG. 3 PRIOR ART
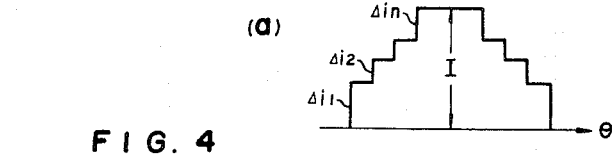
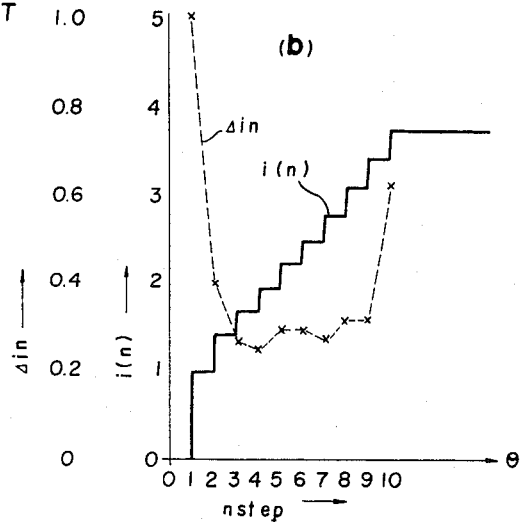
FIG. 4 PRIOR ART

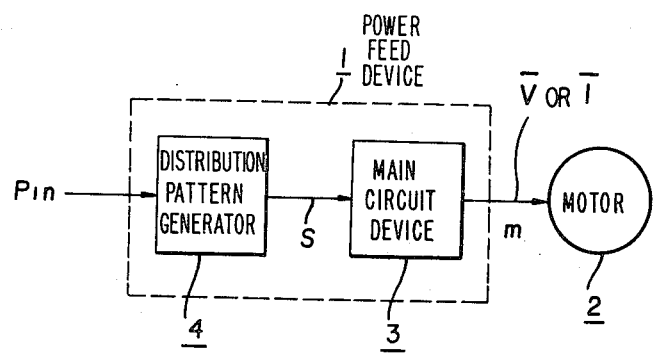
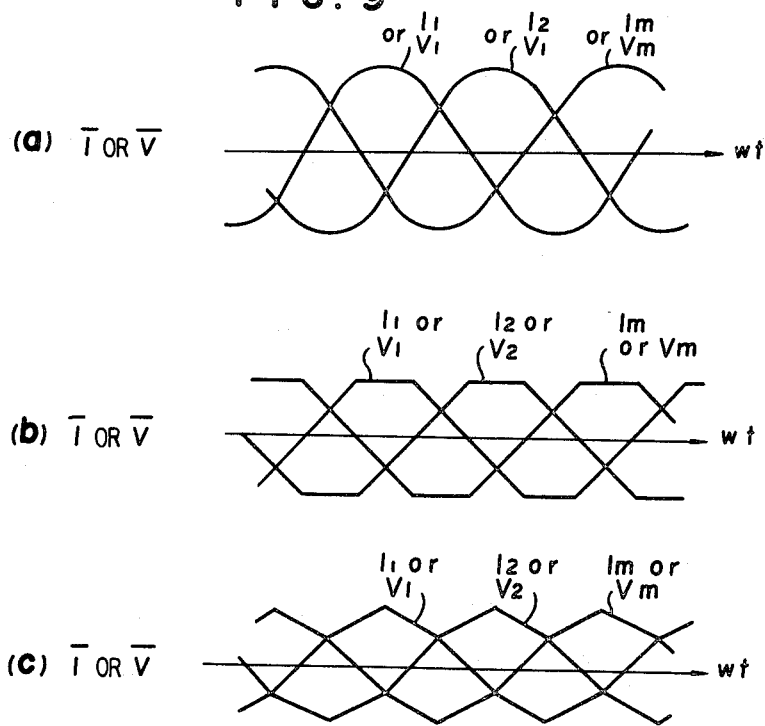

(a)   (b)

INDUCTOR TYPE SYNCHRONOUS MOTOR DRIVING SYSTEM FOR MINUTE CONTROL OF THE POSITION AND THE ROTATION ANGLE OF THE MOTOR

This is a continuation of application Ser. No. 671,710, filed Mar. 29, 1976, now U.S. Pat. No. 4,134,055.

BACKGROUND OF THE INVENTION

This invention relates to improvements in inductor type synchronous motor driving systems for finely controlling the position and the rotating angle, in which the vector rotation angle of the supply power is accurately projected to the mechanical rotating angle and thus highly precise resolving control is readily achieved. That is, in the inductor type synchronous motor of nondistortion electromagnetic structure, the vector synthesis theory is strictly established and, at the same time, high accuracy resolution and smooth rotation are realized simply and uniquely through trigonometric functional power feed.

Prior art motors of this type are referred to as the stepping motor, having a plurality of driving windings and a device for feeding the motor rotationally and in a given sequence, with currents whose phases differ from each other. Among these motors is the type having a DC field means (i.e., DC field winding or permanent magnet), in addition to the driving windings of respective phases. The inductor type synchronous motor to be improved by this invention has a first inductor with an arrangement of first magnetic tooth group, and a second inductor with an arrangement of second magnetic tooth group, the motor further having winding slots for the driving windings and a unit magnetic path (or a magnetic salient) on the back of the magnetic tooth group of the first inductor.

In order to increase the number of steps per rotation, prior art techniques have employed a method of increasing the number of steps, R, (the resolution number R of the vector rotation angle) per cycle (electrical angle $2\pi$) of the feeding current or a method of increasing the number of teeth, $Q_2$, of the second magnetic tooth group. Of the former method, the following methods have been proposed: (1) Method of increasing the number of phases, m, of the driving winding: (2) Method of increasing the number of combinations of windings to which power is fed, that is, n-phase excitation $>(n+1)$-phase excitation; (3) Method of increasing the number of steps, $N_{step}$, where current is fed for the respective phases in stepped waveforms.

These prior art concepts, however, are impracticable for the following reasons:

The relationship between the torque $\tau$; produced and the rotation angle deviation (load angle) $\delta$ in the state of arbitrary power feeding to an m-phase inductor type motor is given as follows according to the torque curve plotted for the i-phase load angle $\delta_i$ of torque $\tau_i$ produced on the i-phase during power feed to the i-phase and on the principle of superposition:

$$\tau = \sum_{i=1}^{m} \tau_i(\delta_i, i_i) \tag{1}$$

where $\delta_i$: load angle for i-phase, having phase difference $\phi_i$ on i-phase against total reference load angle $i_i$: feeding current to i-phase $\tau_i$: torque produced on i-phase The curve of the torque produced on each phase for a given current has no trigonometric functional characteristic as indicated by curves B and C in FIG. 1. To increase the torque gain (gradient near the origin), the torque curve has been made as curve B by the use of uniform magnetic teeth. These curves have hitherto been considered as trigonometric functional characteristic for convenience sake or approximately. Furthermore, the curves offer no linear characteristic with respect to changes in the current fed.

The torque $\tau_i(\delta_i)$ produced at a given load angle $\delta_i$ with current $i_i$ changed follows a nonlinear curve as indicated by curve A in FIG. 2. This curve shows an example of a characteristic referred to as a reluctance motor, i.e., the so-called variable reluctance type (VR type) motor having no DC field. This motor has a square characteristic in the small current region, and a saturation characteristic in the large current region. The pattern (ratio) itself of the curve varies by the load angle $\delta_i$. Therefore, when the current is reduced, the characteristic changes from curve B to curve D as in FIG. 1, and the load angle at the maximum torque point shifts by $\Delta_p$.

In other words, even if the values of currents being fed are changed proportional to each other with respect to the individual phases on the basis of the state that a given current $I_O$ is fed to each phase, the stationary balance point moves as indicated by the curve in FIG. 3, resulting in an error $\phi_\epsilon$ due to variations in the current value I. This has made it impossible to change the feed current when the motor is driven under high-resolution control (minute control or vernier control). Accordingly, it has also been impossible to reduce the time taken to increase or decrease motor speed by producing a large torque during acceleration or deceleration of the motor.

Furthermore, when current feed per phase is given in n numbers of stepped waveforms as in FIG. 4(a), the steps $\Delta i_1$ to $\Delta i_n$ differ from each other and must be adjusted for each motor. FIG. 4(b) shows by example the period for which the current for one phase is increased; the solid line $i_n$ denotes a current value, and the dotted line $\Delta i_n$ denotes the incremental value of each step. In these patterns, there are no simple functional relationships. In motors with the same number of phases and similar in construction to each other, their step patterns differ from each other. The adjustment of the step patterns for the individual motor requires extremely intricate skill because one stationary balance point interferes with another stationary balance point. Furthermore, it is impossible to change the total feed current I because no proportional relationship is established between the total current I and each of the steps $\Delta i_1$ to $\Delta i_n$.

For the above reasons, it has been difficult to accurately increase the number of resolutions by current ratio. Also, it has been impossible to drive a motor of different capacity or construction by the same power feed device or the same power feed control pattern. This has hampered the development of standard systems for driving inductor type synchronous motors.

In prior art techniques, the kind of magnetic teeth which intersect the winding of one phase is purposely limited to one in order to increase the torque gain or the maximum torque itself. In high precision minute resolution control, the feed power is purposely made nontrigonometric in function. This leads to intricate construction of the power feed device and makes its adjustment difficult. Simplifying the construction results in large error in minute resolution control, and the significance of resolution control would be lost.

In the prior art device, there is no linear proportional characteristic between the feed current vector rotation angle and the driving force (torque) balance point.

In the device of phase separation type, there is no composite field gap used in common, corresponding to the current vector rotation angle.

The torque (driving force) balance point is not determined by one-dimensional dynamics according to vector synthesis from the electrical direction of each phase and the produced torque of each phase.

In the prior art devices, the vector rotation angle is made to correspond to the torque balance point $\theta_T$ (although the vector rotation angle does not essentially correspond to the torque balance point in terms of linearity mapping). Such correspondence is attained by nonlogical function means through adjustments. This has required intricate adjusting procedures. In addition, power source fluctuation (current variations) affects the adjusted result. Further, such adjustment is required each time the device is installed in a different place. Still further, setting must be changed for each motor used, and the freedom of the system is considerably limited.

It is an object of the invention to realize minute resolution control with simplicity and high accuracy for inductor type synchronous motor devices which perform high-resolution control.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1 through 4 are characteristic diagrams for illustrating problems of prior art devices.

FIG. 1 shows one-phase excitation displacement-to-torque characteristic,

FIG. 2 shows a current-to-torque characteristic,

FIG. 3 shows a current-to-stationary point variation characteristic, and

FIG. 4 shows a rotation angle-to-current waveform curve.

FIG. 8 is a diagram showing the construction of one embodiment of the invention, FIGS. 9, 10, 12 and 14 are distribution pattern and feed power pattern diagrams for illustrating methods of trigonometric functional power feed according to the invention.

As for high resolution control of stepping motors, prior art techniques have been lacking in fundamental technical concept. In this connection, the outline of the basis on which the technical concept of the invention lies will be first described.

In inductor type polyphase synchronous motors, the polyphase driving winding sets up a driving force by current containing at least a polyphase AC component, to allow polyphase unilateral current or polyphase bilateral current to pass through. The former type is called the single-way type or half-wave type; and the latter, the double-way type or full-wave type.

Figure 5:
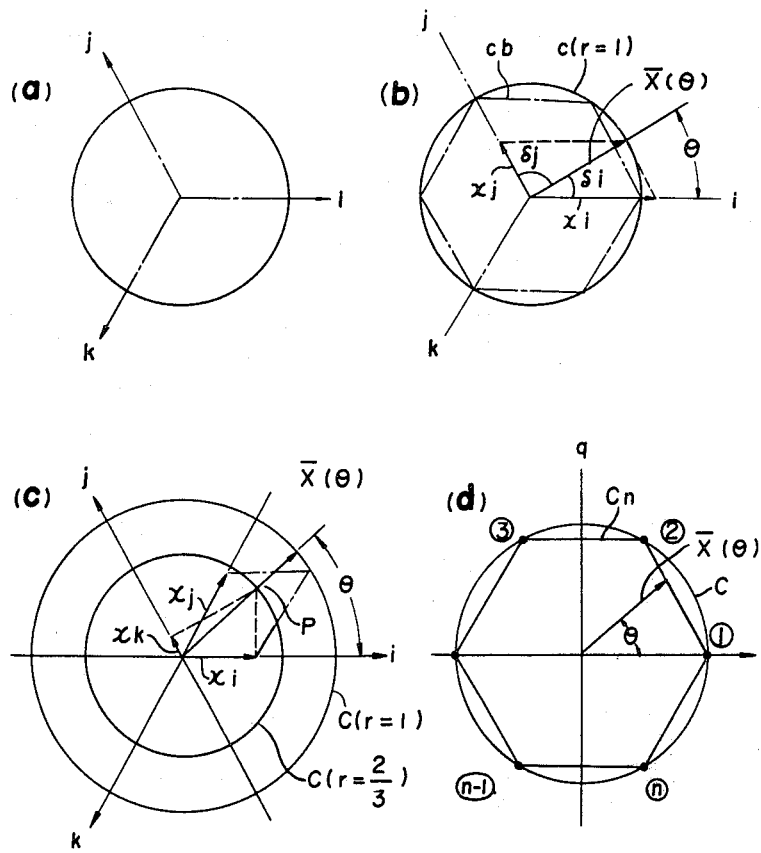
FIG. 5 is a rotation vector diagram for illustrating the technical concept basis of the invention.

Assume that one circulation of current through the driving winding is one cycle, which corresponds to an electrical angle of $2\pi$. Then the driving winding of each phase should be supplied with a current corresponding to its phase. There is an axis in the plane of electrical rotation coordinate corresponding to the phase of the feed current. In the three-phase motor, for example, there are three axes, i, j and k, as shown in FIG. 5(a). In this electrical plane, the axial direction of the current fed to the winding of each phase depends upon the construction and arrangement of the winding of each phase. When, for example, a three-phase motor is driven by two unilateral currents, the fixed axial values $x_i$ and $x_j$ with which the rotation vector $\bar{x}(\theta)$ having an arbitrary rotating angle is obtained signify the current values to be given to the windings having the corresponding axes. If the composite rotation vector $\bar{x}(\theta)$ a circle C whose radius value is 1 (r=1), the values $x_i$ and $x_j$ projected by the dotted lines parallel with the mutual axes represent the values of currents fed to the two corresponding driving windings. The waveforms of these currents at the angle are as shown in FIG. 12(a). If the composite rotation vector $\bar{x}(\theta)$ a hexagon $C_6$ as indicated by the dot-dash line, the waveforms thereof are as shown in FIG. 12(b).

Assume that a three-phase motor is driven by bilateral currents to obtain the desired rotation. In FIG. 5(c), the circle C (r=⅔) is one whose radius is two-thirds the given value 1. For the desired rotation vector $x(\theta)$, the vector values $\bar{x}$ $x_i$, $x_j$ and $x_k$ resulting from vertical projections onto the axes i, j and k from the intersection P of the vector $\bar{X}(\theta)$ and the circle C (r=⅔) represent the necessary current values for the respective phases. This three-phase alternating current is of a waveform which is well-known as shown in FIG. 9(a). While, when the composite rotation vector plots a hexagon $C_6$, the waveforms thereof are as shown in FIG. 9(b) or 9(c).

Generally, a multi-axial (or multi-phase) vector can be converted into a vector of orthogonal two-axis (d, q) coordinate. This means the obtaining of a composite vector of circle C or n-angled polygon $C_n$, as indicated in FIG. 5(d).

Thus, when the axial values $x_i, x_j, \ldots$ of the composite vector $\overline{X}(\theta)$ are made to correspond to the currents of the respective phases, the rotation angle $\theta$ corresponds to the rotation angle of the stationary balance point of the synchronous motor on the current vector thereof. When these axial values are made to correspond to the voltages of the individual phases, the rotation angle $\theta$ corresponds to the rotation angle thereof on the voltage (or current) vector. In this specification, the rotation vector $\overline{X}(\theta)$ which has the foregoing meaning is referred to as a polyphase AC rotation vector for current fed to the polyphase driving winding, or briefly, rotation vector; and its rotation angle $\theta$, as the vector rotation angle. The term "alternating current" does not mean bipolar current on a particular winding; even if the current for one phase is unidirectional, such current may be given a component of opposite polarity due to the cause of other phases and can be equivalent to alternating current. The invention places significance on the AC component at least in connection with the above-mentioned alternating current. This is because a rotation vector is obtainable by the use of AC component. This AC component will herein be referred to as alternating current (AC) or polyphase AC.

In motor drive by stepping, the vector rotation angle changes in the form of step. The number of steps for one period (one cycle, corresponding to an electrical angle of $2\pi$) of the vector rotation angle will herein be referred to as the number of resolutions of vector rotation angle or resolution number R.

Figure 6:
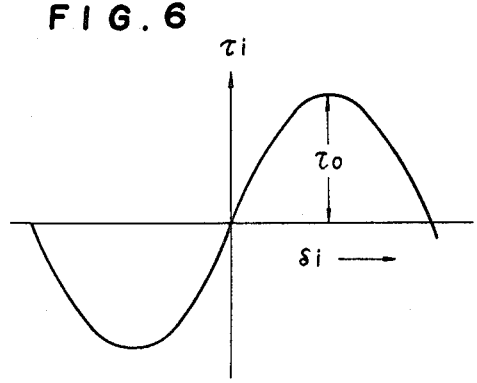
FIG. 6 is a one-phase excitation displacement-to-torque characteristic curve diagram of a low-distortion inductor type synchronous motor used for the purpose of the invention.

In order that the vector rotation angle $\theta$ which is defined by the electromagnetic directivity (magnetic axis) and the current value of each phase correspond accurately to the stationary balance point $\theta_\tau$ of the torque produced, the relationship between the torque produced for each phase and the load angle $\delta_i$ for each phase must be characterized by a trigonometric functional curve as shown in FIG. 6. In practice, the expression of this curve is quite inaccurate althrough prior art techniques have been dependent upon such functional curve for convenience sake, as described by referring to FIGS. 1 to 4. As a result, the vector rotation angle $\theta$ of an electrical quantity (especially current) does not coincide with actual motor rotation angle $\theta_m$ (especially the stationary balance point).

Most prior art inductor type stepping motors have inductor teeth inherent in the individual windings. Substantially, this type of motor is of the phase separation type having independent inductor pair magnetic paths and gaps (where the yoke or the core back may be used in common). The motor of this construction has a gap inherent in each phase but has no common gap (no common space). In other words, the motor has no common gap for producing a rotating magnetic field which is a direct projection of the rotation vector $\overline{X}(\theta)$ of feed current as described by referring to FIG. 5. In such phase separation type motor, there must be a proportional characteristic between the torque $\tau_i$ produced for each phase and the current $i_i$. In this respect, the phase separation motor of VR type (FIG. 2) is quite impracticable.

Figure 25:
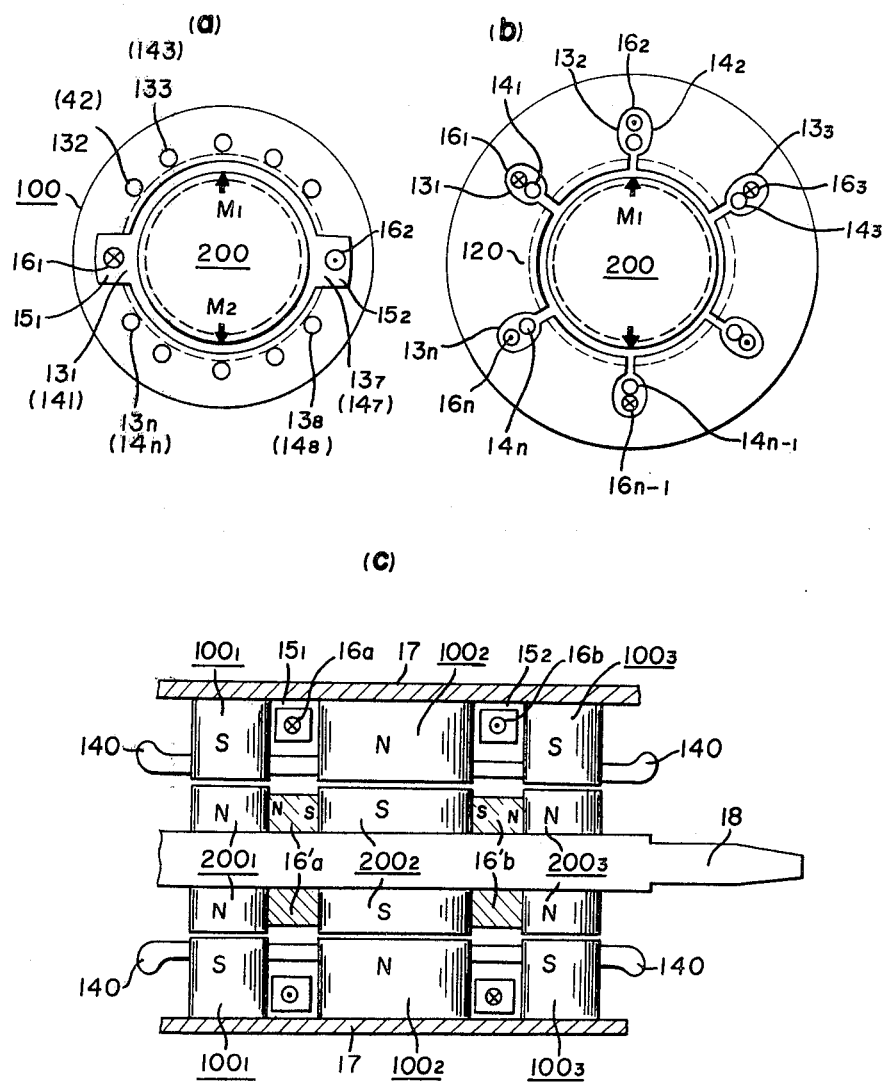
FIGS. 25(a) to 25(c) are diagrams showing the construction of a DC field magnet of the low-distortion inductor type synchronous motor having a DC field magnet, suitable for the purpose of the invention.

To realize such a proportional characteristic, a method in which a DC field is provided, and an AC component is supplied separately to the driving winding is useful, as will be further described later by referring to FIG. 25. According to this method, the characteristic curve for $\tau_i$ and $i_i$ can be improved as in curve B in FIG. 7 which is a saturation curve having a proportional linear part C. In addition, the desired characteristic curve as in FIG. 6 can be obtained by the arrangement that magnetic fluxes of magnetic teeth which differ in the degree of coincidence are made to interlink with the winding of one phase.

Furthermore, according to the invention, inductor teeth are provided in common for the driving windings of the individual phases, and gaps are provided in common, and across the gap, it is possible to produce a rotating magnetic field which is a direct projection of the rotation vector $\overline{X}(\theta)$ of feed current (FIG. 5), as will further be described later by referring to FIGS. 22 and 24. In this case, the proportional relationship between the current $i_i$ and the torque $\tau_i$ is not required. This is because the direction itself of the rotating field depends upon the magnetomotive force itself proportional to the current fed to each phase. In the phase separation type (as will be described later by referring to FIG. 23), the current of each phase is once projected on the torque $\tau_i$, and the rotation angle $\theta$ at the composite torque balance point is determined by synthesizing the torques of the individual phases, resulting in the problem that nonlinearity is introduced in the stage where it is projected on the torque $\tau_i$. However, by producing a rotating field across the common gap, the current (magnetomotive force) vector rotation angle $\theta$ becomes directly coincident with the rotation angle $\theta$ at the composite torque balance point.

In this manner, the vector synthesizing theory is accurately established by the use of the inductor type motor of nondistortion electromagnetic construction in which magnetic distortion is eliminated. Thus the electrical vector rotation angle $\theta$ is made to accurately reflect the torque balance point $\theta_\tau$ and the motor rotation angle $\theta_m$ accordingly whereby highly accurate resolution is realized through simple trigonometric functional power feed control. The invention will be described in more details in connection with a trigonometric functional power feed device, and with an inductor type synchronous motor of nondistortion electromagnetic construction.

FIG. 8 is a diagram showing an embodiment of the invention applied to an inductor type synchronous motor driving device with the aim to describe the invention in detail. In FIG. 8, the reference Pin denotes a digital command input, 1 a power feed device, 2 a low distortion inductor type syncyronous motor suited for the purpose of the invention, 3 a main circuit device for the power feed device 1, comprising a power source 5 and a solid-state switch 6, and 4 a control circuit device for the power feed device 1, capable of generating distribution patterns S for producing "conducting control signals or reference waveform patterns" which determine polyphase feed currents $\overline{I}$ or polyphase feed voltage $\overline{V}$. The distribution patterns S, as will be described later by referring to FIGS. 9, 10, 12 and 14, are signals for feeding power in half-wave, full-wave or pulse-width modulated wave which collectively represents half- and full-wave, or in step-approximated wave; and are substantially projection-wise power-amplified into the feed currents $\overline{I}$ or the feed voltages $\overline{V}$.

Assume that the motor 2 is of three-phase, with bilateral feeding of three-phase AC power, and that its currents $\overline{I}$ or voltages $\overline{V}$ are of sine wave as in FIG. 9(a). Then the rotation vector locus (or briefly, locus) of the feed power is a circular locus C (r=1) as in FIG. 5(c).

When it is a trapezoidal waveform (whose flat section corresponds to an electrical angle of $\pi/3$) as in FIG. 9(b), the rotation vector locus is a regular hexagon (n=6) as in FIG. 5(d). When it is a polygonal-line approximation sine wave as in FIG. 9(c) where the electrical angle is $\pi/3$ for each polygonal section with a gradient of $\pm 1$, and the electrical angle is $\pi/3$ respectively for two polygonal sections each with a gradient of $\pm\frac{1}{2}$, the rotation vector locus is a regular hexagon $C_6$.

(i) Further, these patterns may be of time-ratio modulation waves (pulse-width modulation waves) which represent those shown in FIG. 9.

(ii) Further, these patterns may, in some cases, be of the waveform of the distribution patterns S. In other words, these patterns can be controlled by the main circuit device 3 to agree with the reference patterns S.

(iii) Further, the patterns can be decomposed into a positive half-wave and a negative half-wave, or into various kinds of components. Accordingly, the distribution pattern S can be decomposed into various components.

(iv) The most typical example is such that the distribution pattern S is a pulse-width modulation wave representing waveforms shown in FIG. 9 and includes a conducting signal for positive power feed and a conducting signal for negative power feed. The component of each pulse-width modulation signal consists of components in number corresponding to the number of solid-state switches in the power feed device 3. In this case, the pulse-width modulation pattern S is of a conducting control signal for the solid-state switches, as well as of a pattern for the pulse-width modulation feed voltages $\overline{V}$ or the pulse-width modulation feed currents $\overline{I}$.

The relationships described in (i) through (iv) above do not depend upon the number of phases and is irrespective of whether the feed current to the winding of each phase is unilateral or bilateral. This principle is common to operations shown in FIGS. 10, 12 and 14.

Figure 10:
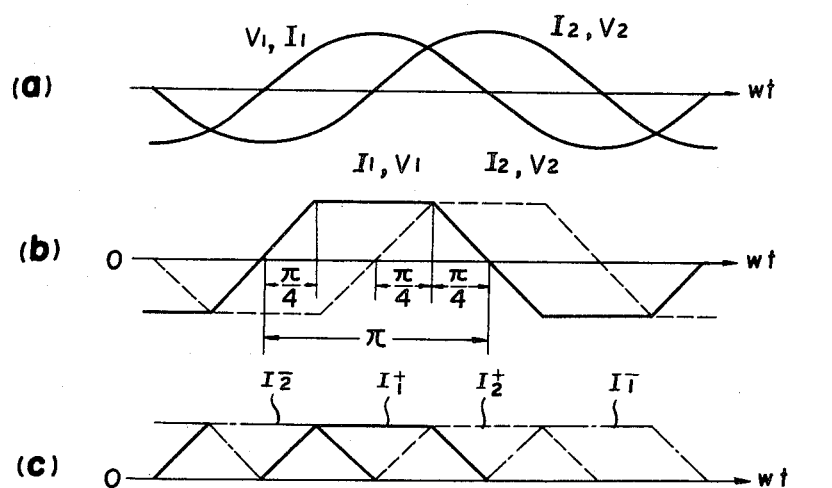

FIG. 10 shows patterns for the instance where the motor 2 is of two-phase as in FIG. 8; FIG. 10(a) is a sine wave bipolar pattern, FIG. 10(b) is a trapezoidal wave bipolar pattern, with the flat section being an electrical angle of $\pi/2$, and FIG. 10(c) is a unipolar trapezoidal waveform pattern. In FIG. 10, the references $V_1$ and $V_2$ denote voltages of the respective phases, and $I_1$ and $I_2$ currents of the respective phases. The reference $I_1+$ indicates the pattern of the first phase positive winding current, $I_1-$ the pattern of the first phase negative winding (or the third phase) current, $I_2+$ the pattern of the second phase positive winding current, and $I_2-$ the pattern of the second negative winding (or the fourth phase) current. The waveform of FIG. 10(a) corresponds to the two-axis (d, q) coordinate of FIG. 5(d) and exhibits a circular locus C, and those of FIGS. 10(b) and 10(c) exhibit an octagonal locus $C_8$.

Figure 11:
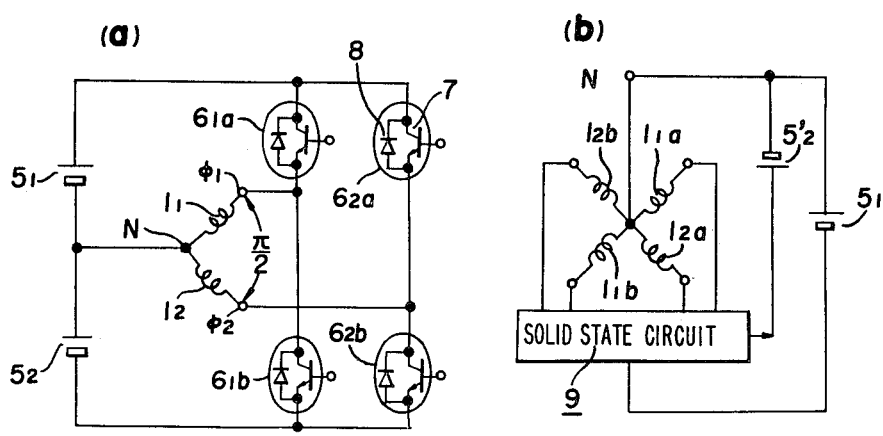
FIGS. 11, 13, and 15 are circuit diagrams of main circuits for the power feed device of the invention.

An example of a power feed device for this motor is illustrated in FIG. 11, in which the references $5_1$ and $5_2$ denote DC power sources, $6_{1a}$ through $6_{2b}$ solid-state switches, and $1_1$ and $1_2$ or $1_{1a}$ through $1_{2b}$ windings of individual phases.

Figure 13:
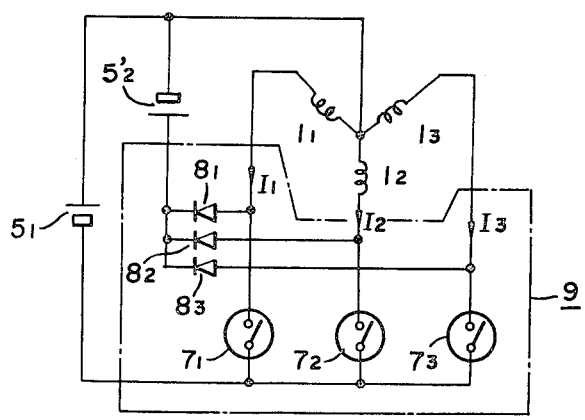

In FIG. 11(b), the reference 9 denotes a solid-state circuit similar to the one shown in FIG. 13 which has a solid-state switch 7 and a diode 8 additionally for each arm.

Figure 12:
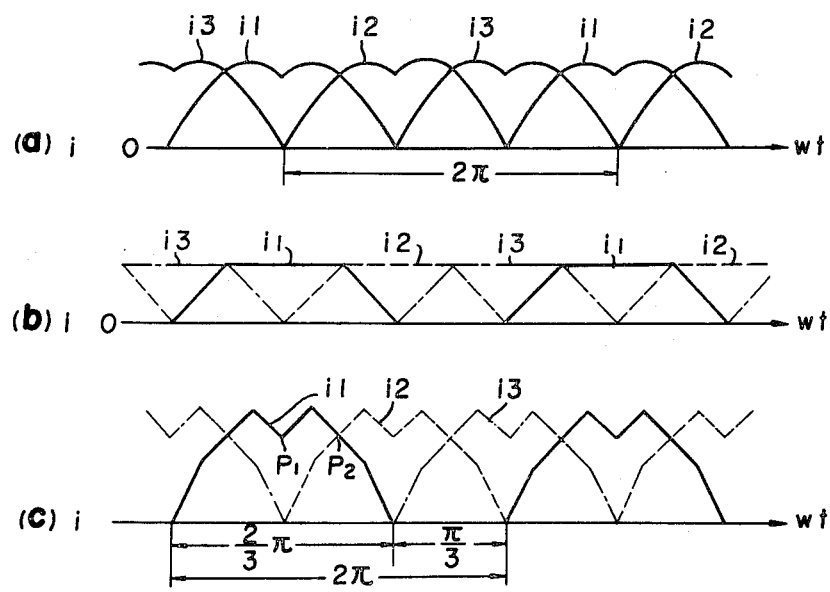

FIG. 12 shows patterns for the instance where the motor 2 is of three-phase and the power feed device is of three-phase half-wave feed. These patterns are of three-phase current (each current $i_1$, $i_2$ and $i_3$).

The pattern of FIG. 12(a) exhibits a circular locus C of FIG. 5(b), each phase pattern consisting of an envelope of two half sine-wave, the two half-sine-wave for one phase having a phase difference by an electrical angle of $\pi/3$ from one another.

The pattern of FIG. 12(b) exhibits a regular hexagonal locus $C_6$ of FIG. 5(b), of which the waveform for one phase is a trapezoidal waveform comprising a flat section corresponding to an electrical angle of $\frac{2}{3}\pi$ and a slope of $\frac{1}{3}\pi$.

The pattern of FIG. 12(c) is one obtained by polygonal line approximation of the pattern of FIG. 12(a) and comprises a section with a gradient of $\pm 1$ and a section with a gradient of $\pm\frac{1}{2}$. In the middle, the pattern has a return point $P_1$ or an intersection $P_2$ at which two phases intersect with each other. One cycle ($2\pi$) of it is divided into 12 parts. This pattern exhibits a regular dodecagonal locus $C_{12}$.

FIG. 13 shows an example of connection of the main circuit for the current feed device as shown in FIG. 12. In FIG. 13, the reference $5_1$ denotes a main source, and $5_2'$ an auxiliary source allowing the flow of current for the device $5_1$ through, for example, a voltage converter. For this voltage converter, a chopper may be used. The references $8_1$ through $8_3$ denote rectifier elements, $7_1$ through $7_3$ solid-state switches such as transistors and thyristors, and $1_1$ through $1_3$ driving windings of the respective phases.

A simple power feed device of a three-phase single way has been described by referring to FIGS. 12 and 13. This device is capable of offering a circular locus C as in FIG. 12(a) and a dodecagonal locus $C_{12}$ as in FIG. 12(c) with a good cost-performance factor. The one offering a hexagonal locus $C_6$ as in FIG. 12(b) makes vector rotation resolution available equivalent to those available as in FIGS. 9(b) and 9(c), with a good cost-performance factor.

Figure 14:
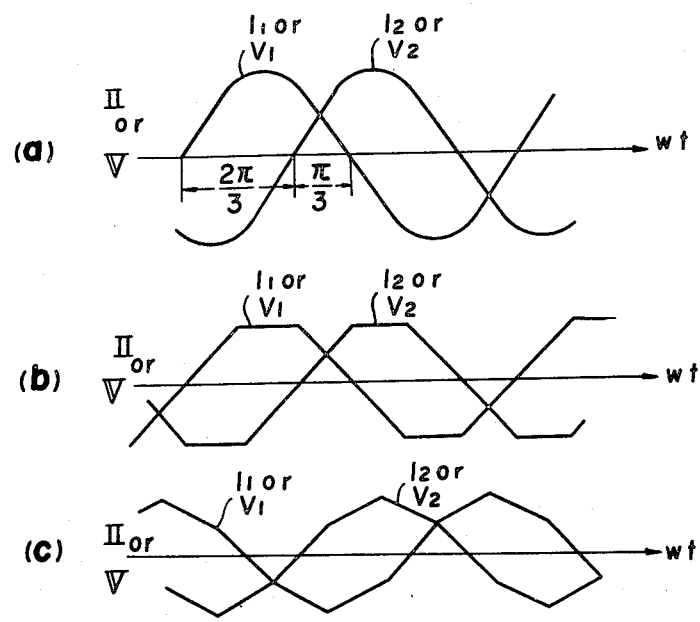
Figure 15:
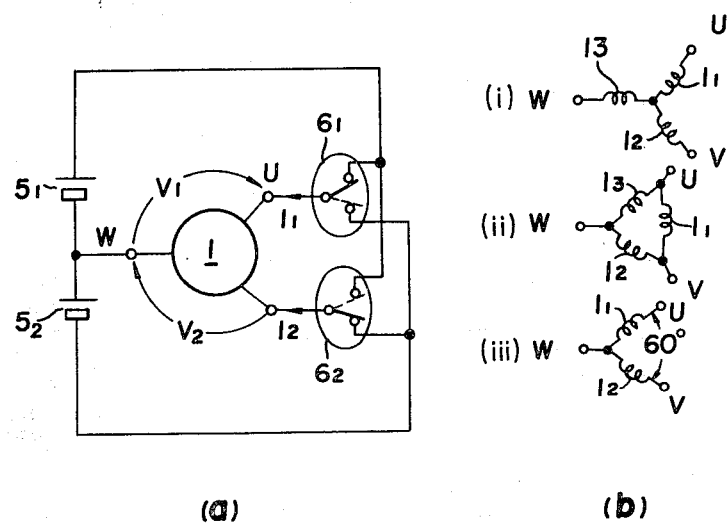

FIG. 14 shows an example of how two-phase (angle difference 120°, 60°) power is fed to a three-phase motor. FIGS. 14(a) to 14(c) are patterns with one phase removed from those of the three-phase as in FIGS. 9(a) to 9(c). FIG. 15(a) shows an example of a main circuit used for power feed with these patterns. In FIG. 15(a), the references $6_1$ and $6_2$ denote solid-state switches (bilateral switching modules) connected in the circuit similar to the switch circuit as in FIG. 11(a). FIG. 15(b) shows connections (i), (ii) and (iii) for motor windings corresponding to these switches; that is, three-phase Y connection, three-phase $\Delta$ connection, and three-phase V connection. The patterns as in FIG. 14, together with the connection arrangement as in FIG. 15, offer rotation vector loci (such as circular locus C and regular hexagonal locus $C_6$) equivalent to those shown in FIG. 9. This embodiment serves to simplify the power feed device and is suited for smaller outputs.

For operation where the same type of three-phase motor is driven under the patterns of FIG. 9 (for example, by a three-phase bridge inverter) at a speed lower than its maximum speed, the patterns and arrangement as in FIGS. 14 and 15 may suitably be utilized. Under normal operation, the patterns of FIG. 9 are used with a Y connection; while, under operation at a torque lower than the maximum torque, the patterns of FIG. 14 are used with $\Delta$ connection as in FIG. 15.

As described above, the locus of rotation vector $\overline{X}(\theta)$ can be drawn into a circle or n-angle polygon (n=6, 8, 12, . . . ) when the voltage $\overline{V}$ or currents $\overline{I}$ of the foregoing patterns, or the voltage or current of pulse-width modulation waveforms representing the foregoing patterns is supplied to the motor windings of the individual phases. Furthermore, it becomes possible to produce a distribution pattern S (reference waveform or turn-on signal for the solid-state switch) for voltage or current to be supplied. The distribution pattern S, i.e., the vector rotation angle $\theta$ of the power feed voltage or current, can be made to correspond to the digital input Pin. Generally this is achieved by the use of a recurrently operable counter, a trigonometric function generator, a sine wave oscillator, a signal generator at a plurality of frequencies, at least one of which is variable, or a like device. Another concrete example is one in which ring counters are used and their outputs are suitably synthesized whereby a pattern approximate to a polyphase sine wave is obtained. When an n-nary notation ring counter is used to count its input up or down by a pulse train of two different frequencies, it becomes possible to obtain a pulse-width modulation pattern S which represents the rotation vector $\overline{X}(\theta)$ of an n-angle polygon. By filtering this pattern S, a variety of segment-approximated patterns can be obtained. Furthermore, when the solid-state switches used are of N numbers being equal to the number n (N=n), these switches can be on-off controlled directly by the output of the n-nary ring counter. This approach is most simple and effective. In this manner, the power feed device 1, the main circuit device 3 and the distribution pattern generator 4 can be realized.

Figure 26A:
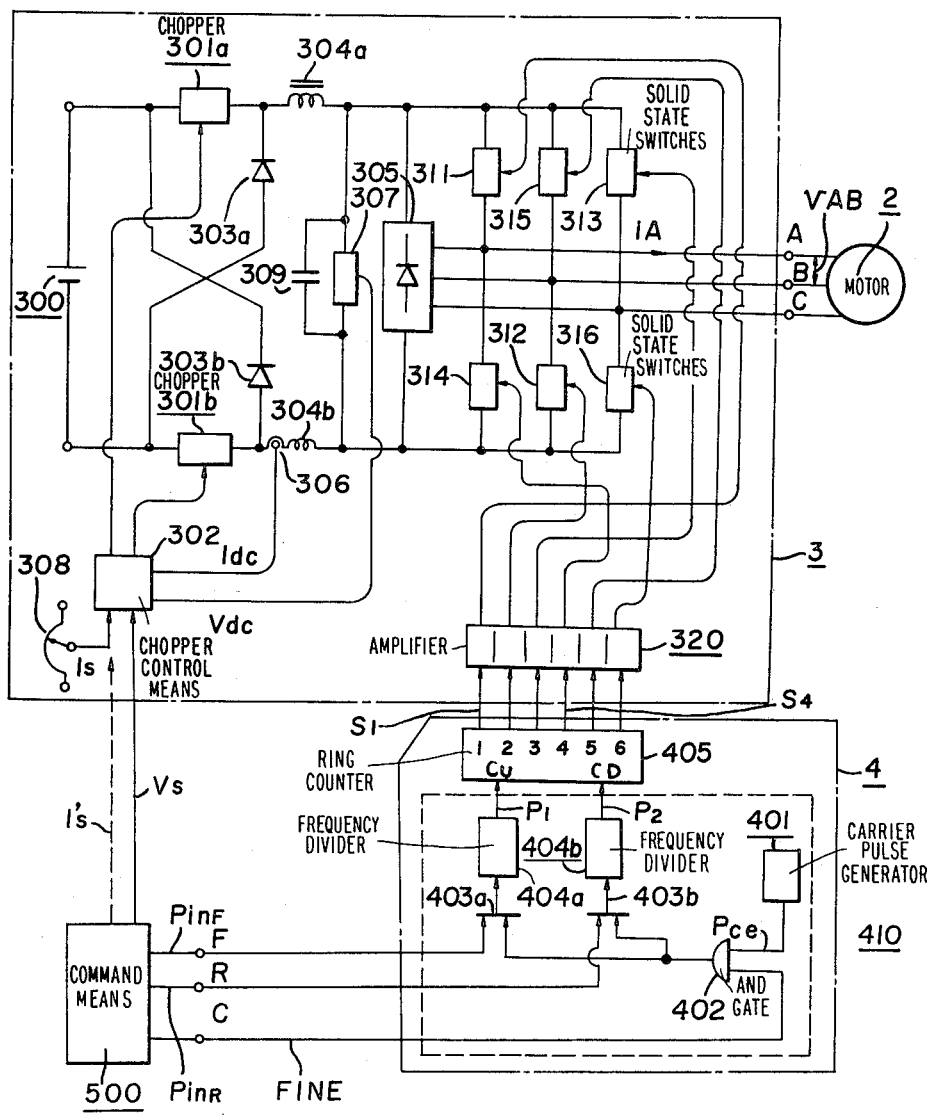
FIGS. 26(a) and 26(b) are circuit diagrams showing in detail two embodiments of a trigonometric functional mode power feed device suitable for the invention.

FIG. 26(a) shows a concrete example of the power feed device 1 corresponding to the embodiment shown in FIG. 8. In FIG. 26(a), the voltage of a DC power source 300 is on-off controlled by chopper 301a and 301b. The DC voltage Vdc is controlled by flywheel rectifier elements 303a and 303b. The resultant voltage is smoothed by DC reactors 304a and 304b and a capacitor 309. The DC current Idc and DC voltage Vdc are detected by detectors 306 and 307 respectively and then compared with the speed interlocking voltage command Vs and the signal Is which sets a current setter 308 or with the adaptation command signal Is' wherein the ratio of turn-on time of the chopper 301a to that of the chopper 301b is controlled by a chopper control means 302.

This power feed device comprises a group of solid-state switches 311 to 316 for the purpose of distributing DC power supply voltage to the individual phases of the inductor type synchronous motor 2, and a rectifier 305 for clipping the solid-state switch voltage and for feeding back the motor reactive current. The choppers 301a and 301b and the solid-state switches 311 to 316 may be of transistors or thyristors.

The power feed device 1 further comprises a gate amplifier or a base driving amplifier 320 for transmitting to a preamplifier, under isolation, signals $S_1$ to $S_6$ which are to turn on and off the solid-state switches 311 to 316.

The turn-on signals $S_1$ through $S_6$ are of the distribution pattern S of FIG. 8 and can be time-ratio modulated to modulate in time-ratio the turn-on time of each of the solid-state switches 311 to 316.

The distribution pattern S ($S_1$ to $S_6$) which serves as turn-on signals is available from the distribution pattern generator 4. The distribution pattern generator 4 comprises a reversible ring counter 405 such as a shift register, up-down counter, decoder, AND-OR logic element for converting the signal of the state of the ring counter, into a suitable pulse width (the ratio of output time to one cycle) in a suitable recurring order, frequency dividers 404a and 404b, pulse train adders (OR elements) 403a and 403b, a carrier pulse generator 401, and a carrier pulse gate element (AND element) 402. In FIG. 26, the numeral 500 denotes a command means.

A positive rotation command pulse PinF comes in from the terminal F, a negative rotation command pulse PinR from the terminal R, and a fine control mode command pulse FINE from the terminal C. When the pulse FINE comes in, a carrier pulse Pce passes through the gate 402 and goes to the pulse train adders 403a and 403b. The frequency of the carrier pulse train Pce is D times as high as the time-ratio modulation frequency $f_{PWM}$. The frequency dividers 404a and 404b divide a given frequency at a rate of 1/D.

Assume a low speed region where $f_{inF} << f_{ce}$ at the input of positive rotation command PinF. Only the carrier pulse Pce is applied to the pulse adder 403b, and the frequency of output pulse $P_2$ of the frequency divider 404b is: $f_2 = f_{ce}/D = f_{PWM}$. This frequency is shown in FIG. 27(b), with period T. The input pulse train PinF is shown in FIG. 27(a). The pulse train adder 403a receives the pulse train PinF and the carrier Pce, and the summed pulse train is supplied to the frequency divider 404a. The frequency $f_1$ of the output pulse train $P_1$ of the frequency divider 404a is: $f_1 = (f_{inF} + f_{ce})/D = (f_{PWM} + f_{inF}/D)$, which is shown in FIG. 27(c). Thus, with the pulse train $P_2$ taken as a reference, time position (pulse phase) of the pulse train $P_1$ advances by $\Delta T$ each time the command pulse PinF comes in, where $\Delta T = T/D$. The ring counter 405 is an N-nary reversible counter (where N=6, in this example). When the input is only the pulse train $P_1$, the ring counter 405 generates the H and L signal at the output terminal in phase sequence. When the output cycle is 2, the H-time $t_H - \pi$, and the L-time $t_L - \pi$, in this example. For instance, with the input of a single count-up pulse train $P_1$, the first output $S_1$ is a positive half-wave signal indicated by the solid line, and the fourth output $S_4$ is a negative half-wave signal indicated by the solid line as in FIG. 27(f).

Figure 27:
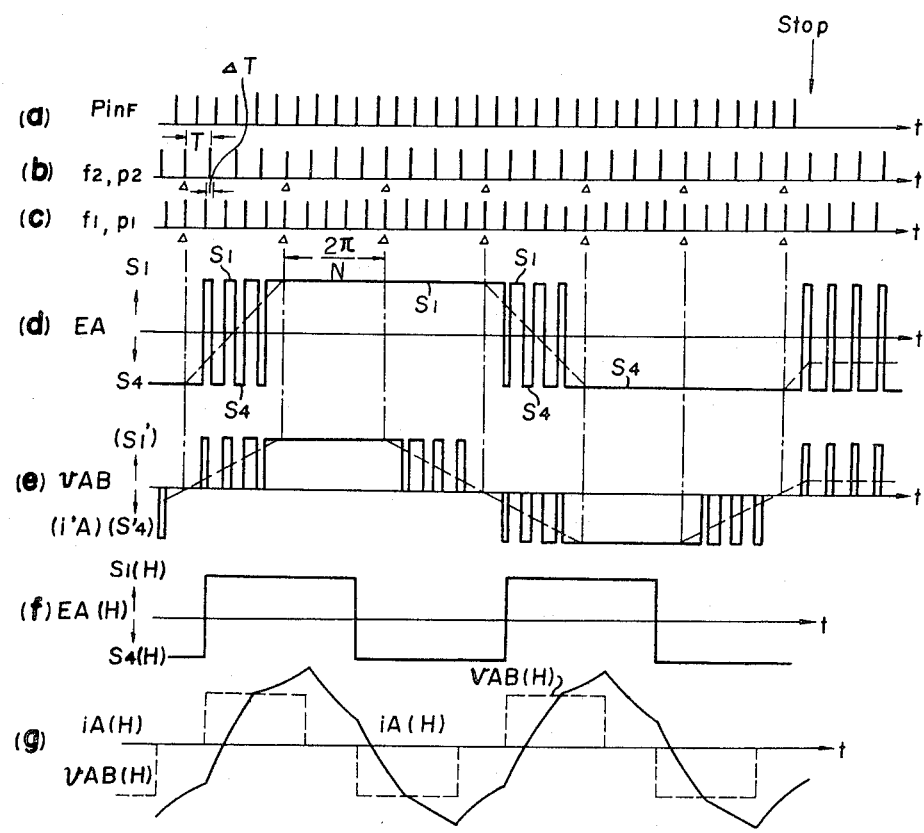
FIG. 27 is a diagram for illustrating the operation of the device shown in FIG. 26.

Assume that the pulse trains $P_1$ and $P_2$ are applied to the count-up input CU and the count-down input CD, respectively, of the ring counter 405, and that the simultaneous pulses indicated by $\Delta$ are eliminated as in FIGS. 27 (b) and (c). Then the ring counter output $S_1$ gives a position half-wave signal as in FIG. 27(d), and the output $S_4$ gives a negative half-wave signal.

The solid-state switches 311 and 314 are turned on by the outputs $S_1$ and $S_4$ respectively. The solid-state switches 311 to 316 are turned on by the patterns $S_1$ to $S_6$ being the same as the signal $S_1$ in waveform (positive half-wave) and having a phase lag by 1/6 cycle behind one another. As a result, the feed potential $E_A$ at the output terminal A of the phase A assumes a waveform as in FIG. 27(d). The mean potential waveform at the terminal A is indicated by the dotted line in FIG. 27(d). At other output terminals B and C there occurs a three-phase output potential in a waveform similar to one shown in FIG. 27(d) with a phase lag by $4/3\pi$ behind one another. Accordingly, the output line voltage $V_{AB}$ becomes as shown in FIG. 27(e). The mean value thereof is in a trapezoidal waveform indicated by the dotted line in FIG. 27(e), which is of the pattern shown in FIG. 9(b). The motor current is smoothed by the motor inductance; in the case of a $\Delta$ connection motor, the phase current comprises a small amount of pulsating component, centering the trapezoidal waveform indicated by the dotted line in FIG. 27(e). While, in the case of a Y connection motor, the phase current comprises a small amount of pulsating component, centering the polygonal line waveform as in FIG. 9(c), which is the same as the waveform of output line current $i_A$ in the example shown in FIG. 26(a).

In the low speed region, the motor and circuit resistances serve as an important factor and hence the DC feed current $I_{dc}$ determines the wave heights of AC output currents $i_A$, $i_B$ and $i_C$. In the high speed region, the AC output current is detected and its value can be controlled as in the case with $I_{dc}$. In other methods, the AC feed current value $I_{ac}$ is detected and can be controlled.

Figure 26B:
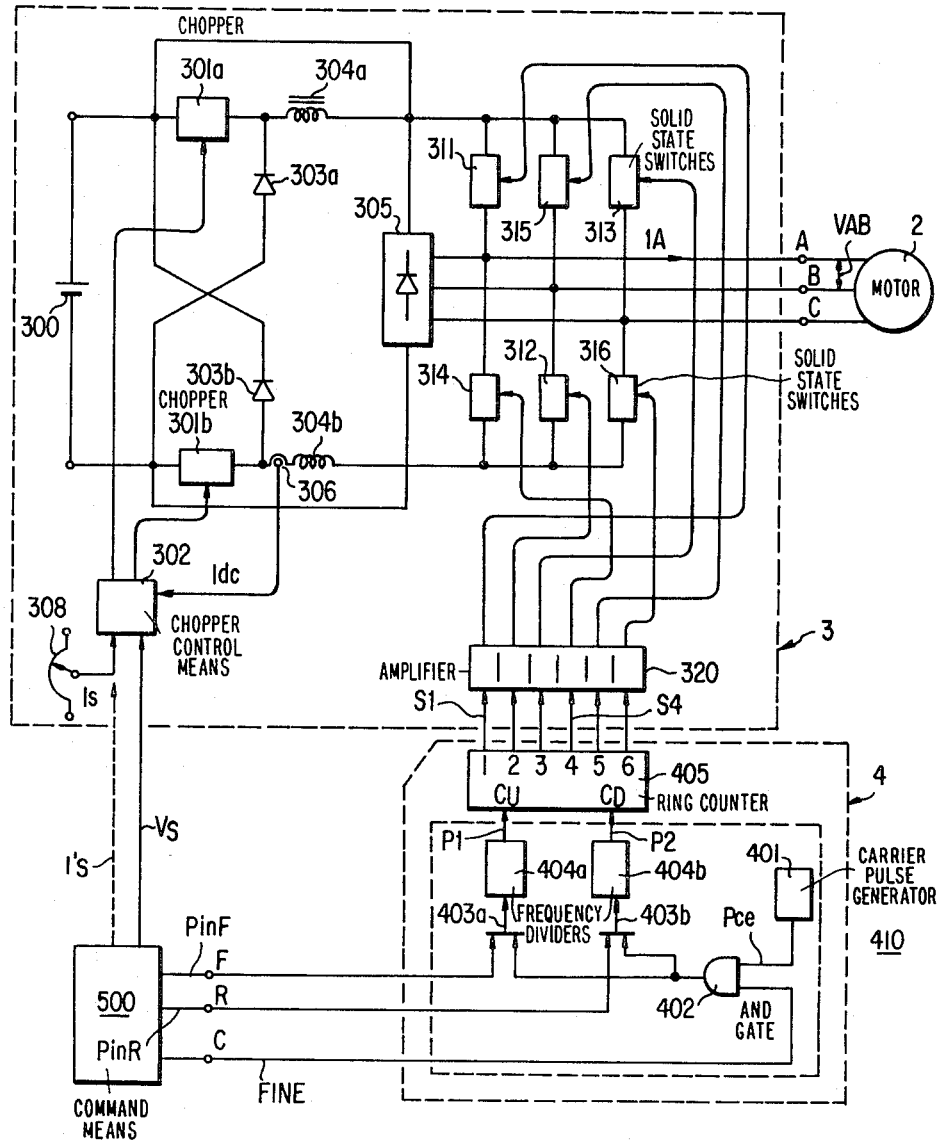

The embodiment as shown in FIG. 26(a) may be modified so that the AC feed currents $i_A$ to $i_C$ are time-ratio-modulated. In such case, the current $i_A'$ assumes the waveform as in FIG. 27(e). For this modification, the capacitor 309 is removed, the DC terminal of the rectifier 305 is connected in parallel to the DC power source 300, and the output time (conduction time of the solid-state switch) is set to $\frac{2}{3}\pi$. This modified embodiment is illustrated in FIG. 26(b).

In FIG. 27, when the command pulse Pin stops at the timing indicated by the "stop" arrow, the pulse trains $P_1$ and $P_2$ afterward become only a pulse of a frequency division of the carrier pulse Pce and stand at the same frequency $f_1=f_2=f_{PWM}=f_{ce}/D$. Therefore the phase difference between $P_1$ and $P_2$ remains in the past state. Under this state, the ring counter 405 does not advance, only repeating up and down. The distribution patterns $S_1$ and $S_4$ become fixed time-ratio signals as indicated in FIG. 27 after the timing "stop" of arrow mark. Thus the ratio of the feed current $i_A$ is maintained. Consequently, the motor stops at the rotating field rotation angle $\theta$ or the driving torque balance point $\theta_m$.

In FIG. 26, one cycle of electrical angle $2\pi$ is resolved at a ratio of 1/N by the ring counter 405. This is further resolved at 1/D by superposing the outputs of frequency dividers 404a and 404b and the carrier pulse train Pce on each other. This is because the turn-on time ratio is controlled on the basis of $\Delta T/T=1/D$. In other words, the number of resolutions R of an electrical angle $2\pi$ is as a whole: $R=1/D\cdot N$.

For these reasons, the electrical angle can be resolved at R=20 to 600 without limitation on the number of phases, such as in the case of a three-phase motor.

When the number of rotor teeth of a motor is $Q_2$, one rotation can be resolved at a ratio of $1/D\cdot N\cdot Q_2$ or of $1/\frac{1}{2}D\cdot N\cdot Q_2$. The value of $Q_2$ may range from 10 to 200. (In larger motors, the value of $Q_2$ can be larger.)

If the inductor type synchronous motor is driven at a high speed as in the universal motor, the output waveform will become high frequency. Therefore it is inefficient for the time-ratio modulation pattern as in FIGS. 27(d) and (e) to be maintained by increasing the carrier frequency proportionally ($f_{ce} \propto f_{in}$) in the high speed region. In other words, load or loss increases on the side of solid-state switches.

According to the invention, two methods are considered to solve the problem. One method is such that the carrier frequency is fixed or nearly fixed at a relatively low frequency. In this case, if $f_{in}>>f_{ce}$ in the high speed region, it becomes possible to obtain square-wave distribution patterns $S_1(H)$ and $S_4(H)$ as in FIG. 27(f). At the same time, the potential $E_A(H)$ at the output terminal assumes the waveform (f) in FIG. 27. As a result, the line output voltage $V_{AB}(H)$ assumes the waveform indicated by the dotted line in FIG. 27(g), and the output line current $i_A$ assumes the polygonal line approximation sine wave indicated by the solid line in FIG. 9(c).

The other method is such that the carrier frequency $f_{ce}$ is eliminated at a speed higher than a given value. The carrier frequency may be constant as in the first method. The carrier frequency is chosen to be $f_{ce}>>f_{res}$ as in the first example, where $f_{res}$ indicates the natural frequency (resonance frequency) of the synchronous motor.

When the frequency $f_{in}$ of the input command pulse PinF or PinR is higher than the resonance frequency $f_{res}$ ($f_{in}>>f_{res}$), the motor 2 rotates smoothly and minute control is not needed. Therefore, when the command indicates a speed higher than a given value, the FINE signal is released and the carrier pulse train Pce is shut out by the gate 402.

In the above manner, the motor operates as a square-wave inverter where the distribution patterns $S_1$, $S_4$, the potential $E_A$ at the output terminal, the line output voltage $V_{AB}(H)$, and the output line current $i_A(H)$ are as shown in FIGS. 27(f) and (g). Thus, by releasing minute control at a speed higher than a given value, the motor can be driven at a higher speed. Under the same maximum speed condition, minute control is available at an extremely low speed, permitting the motor to be driven over a wide range of speed.

In the foregoing embodiment, the distribution pattern S is time-ratio-modulated and corresponds directly to the turn-on control signal, i.e., the feed voltage or feed current. This enables the device to be considerably simplified.

Generally there are available a variety of distribution pattern generators, among which the desirable one comprises a frequency signal generator 410 capable of generating two frequencies $f_1$ and $f_2$. These frequency signals contain a pulse component or at least an AC component. These signals can be converted into a distribution pattern S by a known simple means.

More specifically, one aspect of this approach is such that the first and second frequency signals $f_1$ and $f_2$ can contain a frequency information and relative frequency information, which are projected on the frequency (fundamental frequency or carrier frequency) of the distribution pattern S and hence on the feed power AC frequency.

The second aspect is such that it contains relative phase (phase difference) information, which is an integral value or an analog value of the relative frequency (at least $f_1 - af_2$ where a is a proportional constant). The relative phase is of a generalized positional dimension, whereas the frequency is of a generalized speed dimension. Hence the relative frequency is a value of dimension permitting projection into an electrical angle, a rotating field rotation angle or a balance point (stationary position) of the driving force of the synchronous motor 2.

Accordingly, when at least two frequency signal generators are provided, and the frequency of one of the two is made variable, the signal can readily be converted into various distribution patterns S suited for minute control for the purpose of the invention. The embodiment shown in FIG. 26 is one example showing the above principle. Another concrete example is such that a distribution pattern having a relative frequency ($f_1$-$f_2$) and a minute waveform pattern (minute relative phase information) can be obtained by amplitude modulation between two sine-wave frequency signals or by heterodyne modulation. Also, the signal can be converted into a distribution pattern having a relative frequency ($f_1-f_2$) and a minute waveform pattern (minute relative phase information) by on-off modulating one sine-wave frequency signal by a square-wave frequency signal (where the on-off modulation corresponds to multiplication in a synchronous rectifier or analog switch circuit). These approaches are simple yet desirable for the purpose of generating various patterns as shown in FIGS. 9, 10, 12 and 14. The foregoing frequency signals can readily be generated by a variety of known pulse generators or oscillators, analog frequency converters, or the like.

A continuous curvature pattern waveform, a polygonal line waveform or a minute step waveform can be converted into a distribution pattern (turn-on control signal) which has been time-ratio-modulated by a time-ratio modulation means. The distribution pattern is substantially power-amplified and projected on the electrical quantity of the feed power.

One embodiment of the invention applied to a power feed device 1, and its effective approaches have been described in detail by referring to FIG. 8.

To meet the function of the power feed device 1 as in FIG. 8, the inductor type synchronous motor 2 must accurately follow the rotation angle of the AC component vector $\bar{x}(\theta)$, and minute controls thereof must be accurately reflected and projected to the driving force (torque) balance point $\theta_T$. Otherwise, the performance quality of the foregoing power feed device cannot be fully exhibited. Various factors and improvements for the inductor type synchronous motor needed for minute and accurate driving control according to the invention will be described in detail, together with novel effects available when the motor is operated in combination with the power feed device 1.

Figure 16:
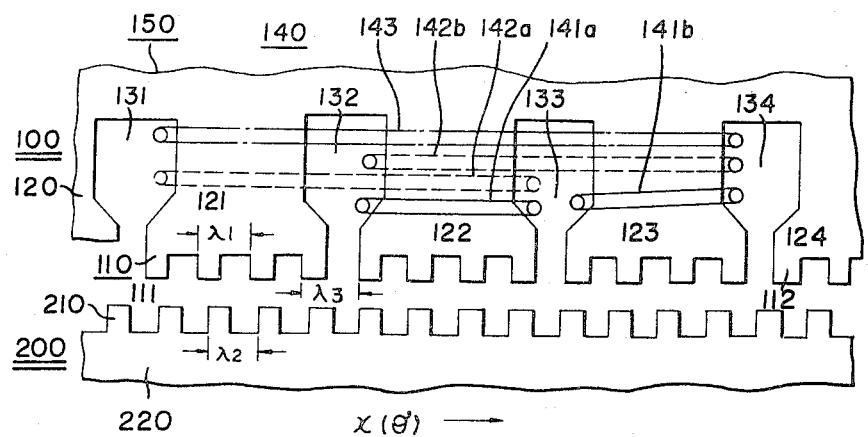
FIGS. 16 through 20 are enlarged views showing the construction of the inductor and the driving winding slot portion of the low-distortion inductor type synchronous motor, and unit coil flux intersecting relationship.

FIG. 16 shows one embodiment of the invention applied to an inductor type synchronous motor for which magnetic field modulation is effected by use of an inductor. This corresponds to a linearized cross-sectional view of part of a linear motor or of part of a disk type motor. In FIG. 16, the reference 100 denotes a first inductor, and 200 a second inductor. The second inductor comprises a core back 220 and a plurality of second magnetic tooth group 210 projected on the surface of the core back 220. Assume that the pitch of the second magnetic teeth is $\lambda_2$. In the disk type structure, it may be so arranged that the second comprises magnetic segment group (which corresponds to the magnetic tooth group) implanted on a support body (support base) without using the core back 220, and the support body is interposed between the first inductors 100.

The first inductor 100 has a first magnetic tooth group 110 with pitch $\lambda_1$. On the back of the first inductor are unit magnetic path (magnetic shunt) group 120 to 120n, and slot group 130 to 130n for the windings. The first group of magnetic teeth are projected opposite to the gap of the unit magnetic path. The unit magnetic paths 120 to 120n are linked to each other by a core back 150. It may be so arranged that the unit magnetic paths forming pairs of N-S poles are linked, pair by pair, by a core back magnetic path (not shown). This construction is suitable when U-shaped unit-magnetic paths are disposed or C-shaped unit-magnetic paths are disposed across the disk type second inductor.

When the pitch of the first magnetic tooth between the unit magnetic paths 121 and 122 which are separated from each other by the winding slot 132 is $\lambda_3$, then $\lambda_3 = k_1 \lambda_1$ (where $k_1 = 1, 2, 3, \ldots$). When $k_1 = 1$, this value is the removal number of the first magnetic tooth, i.e., the removal number per unit magnetic path interval. FIG. 16 shows an example where $k_1 = 1$ and hence the removal number is 0. The unit magnetic path interval can be matched with the pitch $\lambda_2$ of the second magnetic tooth by the arrangement where $\lambda_3 = (\lambda_1 + K_2 \lambda_2)$ where $k_2 = 0, 1, 2, \ldots$ This principle is applicable to other unit magnetic paths. For instance, when $\lambda_3 = (\lambda_1 + K_2 \lambda_2)$, it becomes possible to determine the unit magnetic path interval individually depending on conditions.

Conductor wires for the driving windings are inserted in the slots 131 to 131n respectively, thus forming a group of unit coils 140 with a suitable coil pitch. The first pitch unit coil 141a is wound on the unit magnetic path 122. The second pitch unit coil 142a or 142b is wound on two adjacent unit magnetic paths 121 and 122 (or 122 and 123), and intersects the magnetic fluxes of the two unit magnetic paths. The second pitch unit coil 142b is equivalent to the series of the first pitch unit coils 141a and 141b which are wound on the unit magnetic paths 122 and 123 respectively. The third pitch unit coil 143 is wound on three unit magnetic paths 121, 122 and 123 and intersects the magnetic fluxes of these unit magnetic paths. Generally, the $k_3$-th pitch unit coil which intersects the fluxes of $k_3$ numbers of unit magnetic paths can be formed.

The driving windings $l_1$ to $l_m$ for one phase are formed by connecting a single or plural unit coils 140 serially or in parallel.

When $\lambda_3 = \lambda_1$ in the embodiment in FIG. 16, a coincidence or a occurs between the first and second magnetic teeth at each $\lambda_{12}$ (not shown) which is the least common multiple of the first magnetic tooth pitch $\lambda_1$ and the second magnetic tooth pitch $\lambda_2$. The same degree of coincidence occurs between other first and second magnetic teeth, also at the pitch $\lambda_{12}$. In other words, the degree of coincidence (i.e., the permeance of one of the first magnetic teeth to the second inductor) differs with respect to the spatial position X (or spatial angle $\theta'$) and changes recurrently (periodically). The recurrent pitch is $\lambda_{12}$.

The degree of coincidence differs on the first magnetic teeth with respect to one another within one cycle $\lambda_{12}$. One degree of coincidence (permeance) can be differentiated from another by the following value (absolute value) and directivity (polarity); first, the absolute value $a_s$ of an area of one of the first magnetic teeth 110 opposite to one of the second magnetic teeth 210, and second, the directivity causing the second inductor 200 to be moved in a given direction (positive direction). Thus the difference in the degree of coincidence can be determined by the polarity of the differentiated value (varying ratio) $da_s/dx$ (where dx is a positive direction) according to whether the absolute value $a_s$ is on the increase or decrease with the movement of the second inductor 200 in a given direction. Accordingly, the difference between the degrees of coincidence can be found by the relative positional relationship, and hence the kind of the degree of coincidence can be defined according to the differentiated result. The kind of the degree of coincidence will be described below. The degree of coincidence on one of the first magnetic teeth (reference magnetic teeth) changes periodically with the relative motional displacement $\theta_m$ of the first inductor 100 to the second inductor 200. When the value of periodic functional changes is $f(\theta_m)$, the degree of coincidence $a_{si}$ on other arbitrary magnetic tooth is given by the following equation. Assume that the flux of the i-th of one of the first magnetic teeth is $\phi_i$.

$$a_{s1} = f(\theta_m - \zeta_{11}) \propto \phi_1$$

$$a_{s2} = f(\theta_m - \zeta_{12}) \propto \phi_2$$

$$a_{si} = f(\theta_m - \zeta_{1i}) \propto \phi_1 \quad (2)$$

where $\zeta_{1i}$ is the spatial periodic phase difference between the reference first magnetic tooth and the i-th one of the first magnetic teeth.

In other words, the flux of each magnetic tooth is magnetically modulated by the degree of coincidence $a_{si}$. The mean flux distribution across the gap assumes a pattern which is magnetically modulated by the distribution of the degree of coincidence $a_{si}$.

The kind of group of first magnetic teeth 110 as in FIG. 16 is determined by the foregoing spatial phases $\zeta_{11}$ to $\zeta_{1l}$. The number of kinds H thereof is:

$$H = \frac{\lambda 12}{\lambda_1 - \lambda_2} \quad (3)$$

One of the first magnetic teeth 111 is nearly the same as another 112 in FIG. 16 with respect to the absolute value of the degree of coincidence, but differs from the tooth 112 as to directivity (polarity) and phase $\phi$ in Eq. (2).

The first pitch unit coil 141a, for instance, intersects the fluxes of 8 different ones of the first magnetic teeth. The third pitch unit coil 143 covers 12 different ones of the first magnetic teeth. When the series of the first pitch coils 141a and 141b is used for one phase of the driving winding, this winding intersects the fluxes of 8 different ones of the first magnetic teeth. While, when the series of the second pitch coils 142a and 142b is used for one phase of driving winding, this winding intersects the fluxes of 12 different ones of the first magnetic teeth. The flux intersecting ratio (the number of flux intersections) is larger by four of the first magnetic teeth installed on the unit magnetic path 122 than by eight of the first magnetic teeth installed on the unit magnetic paths 121 and 123. This is equivalent to an increase in the area of a magnetic tooth facing the gap, the flux intersecting ratio of the magnetic tooth being large.

In the embodiment as in FIG. 16, as described, fluxes of many kinds of magnetic teeth affect (intersect) each other, with the result that the relationship between the deviation angle $\theta_i$ regarding the i-th phase and the torque $\tau_i$ for the i-th phase is markedly improved as in FIG. 6, as opposed to the one shown in FIG. 1 wherein the magnetic teeth of one kind intersect fluxes. The reason for this is as follows.

As indicated by Eq. (2), h numbers (h-H) of fluxes of magnetic teeth, i.e., degrees of coincidences on different phases, are compositely intersected with the driving winding of one phase. When the number of intersections of the j-th phase driving winding with the i-th magnetic tooth flux $\phi_i$ is $W_i$, the number $\Psi_j$ of intersections of the j-th driving winding with fluxes is:

$$\psi_j = \sum_{i=1}^{h} w_i \phi_i \quad (4)$$

where $i=1$ to h-th magnetic tooth intersects the j-th phase. While, when the periodic function is $f(\theta_m)$, then $$\phi_i = \phi_0 \left\{ 1 - \sum_{\nu=1}^{\alpha} a_\nu \cos \nu (\theta_m - \phi_{1i}) \right\} \quad (5)$$

where
$\phi_0$: mean tooth flux (DC component)
$a_\nu$: ratio for DC component of $\nu$-th order component.
Assume that the fluxes intersecting the j-th phase are $\phi_1$ to $\phi_h$. Then the phase deviations $\zeta_{11}$ to $\zeta_{1h}$ lie in the range of $\zeta_j \pm \Delta \zeta$, where $\zeta_j$ is the deviation from the reference phase of the j-th phase driving winding. Assume $\Delta \zeta < \pi/2$. Accordingly, for $\Psi_j$, the DC component and the first order component are emphasized by synthesis of the order $\nu$ and different $\zeta_{1i}$ and thus the higher order component is canceled. It is effective that the center magnetic tooth is intersected with a larger number of turns for $w_i$. (In FIG. 16, the coils 142a and 142b are connected in series, or the coils 141a and 141b are connected in series to each other.) As a consequence, Eq. (4) may be expressed as follows, with no appreciable error.

$$\Psi_j = \Psi_0 \{1 - A_1 \cos (\theta_m - \zeta_j)\} \quad (6)$$

where $$\psi_0 = \sum_{i=1}^{h} w_i \phi_0 :$$

the number of total flux intersections of fixed portion (mean flux ratio value)

$$A_1 = \frac{1}{\psi_0} \sum_{i=1}^{h} W_i a_1 \cos(\phi_{1i} - \phi_j):$$

content ratio after synthesis of first order component (constant)

$$\pi/2 > \Delta \zeta > (\zeta_{1i} - \zeta_j) > -\Delta \zeta > -\pi/2$$

The differential value $\Psi = d\Psi_j/d\theta_m$ is:

$$\Psi_j = \Psi_0 A_1 \sin (\theta_m - \zeta_j) \quad (7)$$

It is apparent that the torque curve as in FIG. 6 can be obtained by substituting the i-th one with the j-th one and by determining $\zeta_i = (\theta_m - \zeta_i)$, because the torque is proportional to $\Psi_j$. Equation (7) signifies that the internal velocity e.m.f. due to the relative motion $d\theta_m/dt$ becomes a sine wave. In other words, the nondistortion inductor type synchronous motor of the invention has a sine-wave internal c.m.f. as in those of general power use.

When the following current $i_j$ of the j-th phase is passed through, $$i_j = I_1 \sin (\theta - \zeta_j - \pi/2) \quad (8)$$

then the following equation is obtained since the j-th phase torque $\tau$ is proportional to the product of $\Psi_j$ and $i_j$.

$$\tau_j = \Psi_0 A_1 I_1 \tfrac{1}{2}\{(\sin(\theta - \theta_m) - \sin(\theta + \theta_m - 2\zeta_j)\} \quad (9)$$

Generally, in the case of m-phase, the following is chosen:

$$\left. \begin{array}{l} j = 1, \ldots, m \\ \phi_j = \frac{2\pi}{m} \cdot j \end{array} \right\} \quad (10)$$

Thus the total torque $\tau$ is led from Eqs. (9) and (10):

$$\tau = \sum_{j=1}^{m} \tau_j \quad (11)$$

$$= \psi_{-0} A_1 I_1 \frac{m}{2} \sin(\theta - \theta_m)$$

where $\sum_{j=1}^{m} \sin\left(\theta + \theta_m - 2\frac{2\pi}{m} \cdot j\right) = 0$ Accordingly, the second term in the braces of Eq. (9) is canceled, where $(\theta - \theta_m)$ represents the total load angle $\delta$. The motor rotation position $\theta_m$ at which the torque $\tau$ is zero is the torque balance point (electromagnetic force driving force balance point) $\theta_\tau$.

$$\left. \begin{array}{l} \delta = (\theta - \theta_m) \\ \theta_\tau = \theta_m \mid \tau = 0 \ldots \tau = 0 \end{array} \right\} \quad (12)$$

where $\theta_m$ satisfying $\tau = 0$ As in Eq. (8), the angle $\theta$ is the vector torque rotation angle (FIG. 5) of polyphase AC, and the electromagnetic force balance point fully corresponds to the vector rotation angle of polyphase AC.

One prior art problem lies in the presence of a large error (distortion) which cannot be approximated by Eqs. (6) and (7).

The reason for this is because the prior art construction has magnetic teeth of one single kind, exhibiting a $\tau_i - \delta_i$ characteristic curve as in FIG. 1, without having the function of canceling the higher order component.

According to the invention, the operation of an inductor type synchronous motor is made to correspond to the vector rotation angle $\theta$ of the feed AC only when many kinds of magnetic teeth have a flux intersecting relationship. In this concept, the vector composite theory is exactly established. It is important that many kinds of magnetic teeth be intersected with fluxes to permit the motor to be rotated uniquely and accurately in response to the electrical quantity vector rotation angle $\theta$.

Whereas, in prior art techniques, it is necessary that the currents of the individual phases be changed non-trigonometrically in function or the currents be minutely adjusted as the stationary point is checked all the time, in order to achieve accurate and minute rotation of the motor. Furthermore, because the vector rotation angle $\theta$ of the feed current is not reflected directly on the stationary balance point $\theta_\tau$, the resolution accuracy of the stationary balance point is lowered if the current representing value (wave height value) $I_1$ as in Eqs. (8) and (11) is changed.

According to the invention, the current value $I_1$ serves as the proportional coefficient of torque, causing no deviation of the vector rotation angle, i.e., the stationary balance point. This readily permits the current value $I_1$ to be suitably varied and controlled.

Figure 17:
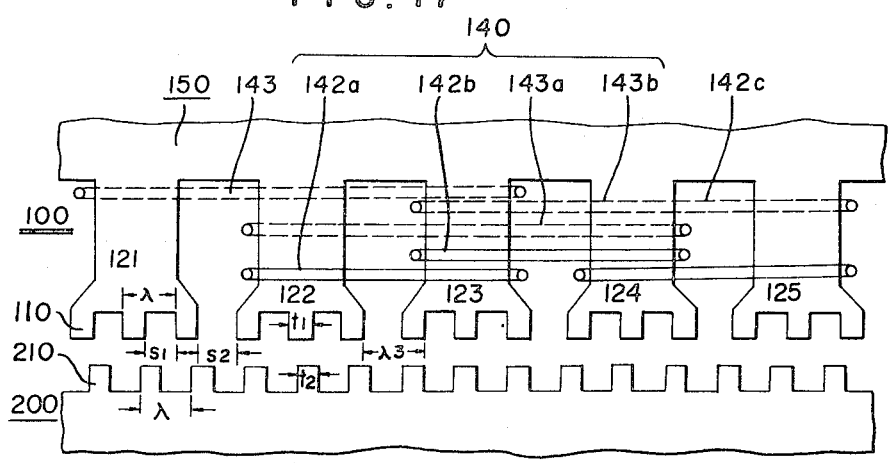

FIG. 17 shows another embodiment of the invention wherein the first magnetic tooth pitch $\lambda_1$ and the second magnetic tooth pitch $\lambda_2$ are both $\lambda$, within one unit magnetic path. The distance $S_2$ between unit magnetic paths differs from the nonmagnetic width $S_1$ of the first magnetic tooth. Here the pitch $\lambda_3$ is not a multiple of the integer of the pitch $\lambda_1$. In this sense, the degree of coincidence is deviated for unit magnetic paths different from one another. In this case, the number H of kinds of degrees of coincidence is reduced. The unit coil is wound on a plurality of unit magnetic paths. In this arrangement, the number h of the kinds of magnetic teeth which intersect the driving winding of one phase increases and hence it is desirable that a certain number of unit coils be connected in series to each other so that they intersect the fluxes of h-number of unit magnetic paths; for instance, the coils 142a and 142b, or 143a and 143b, or 142a and 142b and 142c, or 143a and 143b and 143c are connected serially.

Figure 18:
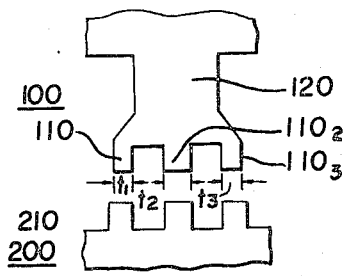

FIG. 18 shows a method for increasing the number of kinds of degrees of coincidence for one unit magnetic path. The tooth widths $t_1$, $t_2$ and $t_3$ may be differentiated from each other, or the tooth centers may be differentiated, in addition to different tooth widths, such as teeth 110 and 110$_3$ which are equal to each other in respect to tooth width but differ from each other in respect to the tooth center and phase $\zeta_{1i}$. The arrangement concerning the number of kinds of degrees of coincidence is described in Japan Patent Application No. 48-69474 (1973).

Figure 19:
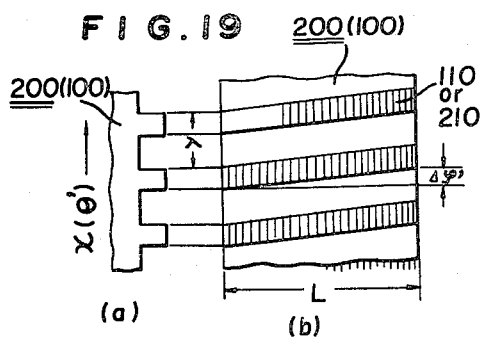

FIG. 19 shows another method for increasing the number H of the kinds of degrees of coincidence, wherein FIG. 19(a) is a side view of the second inductor 200, with the relative motion direction $X(\theta')$ taken as the longitudinal direction. FIG. 19(b) is a view taken of the facing gaps with their surfaces up, wherein the reference L denotes the length of a cylindrical second inductor in the axial direction, which, for instance, corresponds to the laminated thickness. The reference $\Delta \zeta$ denotes the value of deviation by $\Delta \zeta'$ in the relative motion direction of the tooth within the length L. This deviation is within the value $\lambda/2$ ($\tfrac{1}{2}$ pitch). By this arrangement, the number of kinds of degrees of coincidence can be made equal to the number of plates of the laminated cores. Substantially, the number of kinds of magnetic teeth can be arbitrarily increased. Instead of continuously deviating them, they may be deviated in steps. These arrangements are described in Japan Patent Application No. 48-72603 (1973).

The above methods of increasing the number of kinds of first magnetic teeth can be effectively applied to the embodiments shown in FIGS. 16 and 17.

Figure 20:
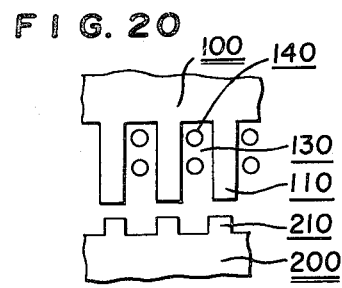

FIG. 20 is a partial view of a winding method wherein the nonmagnetic space between the first magnetic teeth is expanded where conductors are installed. By this arrangement, the number of unit coils can be increased, the value $W_i$ in Eq. (4) can be changed trigonometrically in function (in the form of step approximation) according to the i-th number, and thus the effect of canceling the higher order component against the fundamental component can be enhanced. In other words, the fundamental component can be increased when the same canceling effect is considered. Furthermore, characteristics can be improved by reducing the leakage inductance.

Described above is the principle of the invention wherein the number of kinds of magnetic teeth (kinds of degree of coincidence) which intersect the fluxes of the driving winding of one phase is increased for the purposes of the invention.

Next, the effect of the invention in connection with the arrangement that the magnetic teeth intersect a plurality of unit magnetic paths to make it possible to increase the coil pitch for one phase will be described below, together with the concept of the overall winding construction in a cylindrical motor.

Figure 21:
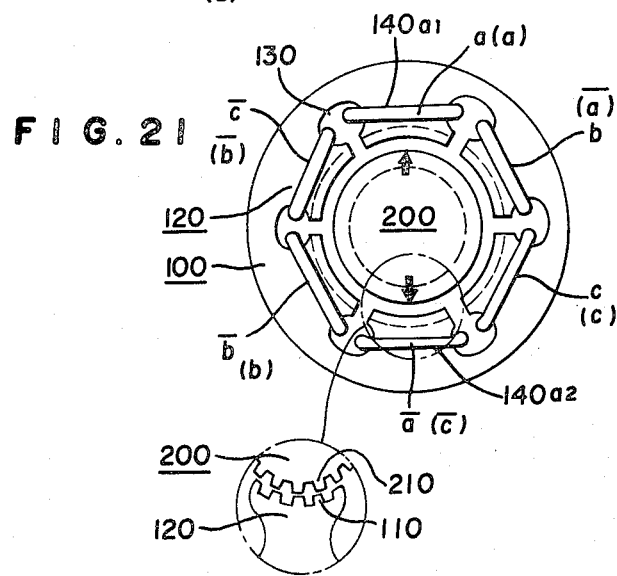
FIGS. 21 through 24 are diagrams showing methods of winding the driving windings of the low-distortion inductor type synchronous motor used for the invention.

FIG. 21 is a circular pattern showing a method of using a short-pitch winding having no DC field. In FIG. 21, the reference 130 denotes a winding slot, and the arrow indicates the region where the degree of coincidence between the first magnetic tooth 110 and the second magnetic tooth 210 is large. Detailed portions of the magnetic tooth are indicated roughly by the dotted lines, in practice, there are a distribution of magnetic teeth as shown by an enlarged diagram indicated in the circuit of dot-dash lines. (This portion will be shown briefly in the succeeding embodiments.)

FIG. 21 shows an example of three-phase-6-slot 2-pole construction, wherein unit coils a and $\bar{a}$ are windings of A-phase and form a pair of magnetic poles, N and S (or S and N when the current is inverse), for the second inductor 200. Similarly, unit coils b and $\bar{b}$ are windings of B-phase, and unit coils c and $\bar{c}$ are windings of C-phase. There may be the combination of unit coils indicated in the parentheses. This arrangement, however, causes an eccentric magnetomotive force. Hence this is desirable for applications where there are more than twice the number of poles or the number of slots.

Figure 22:
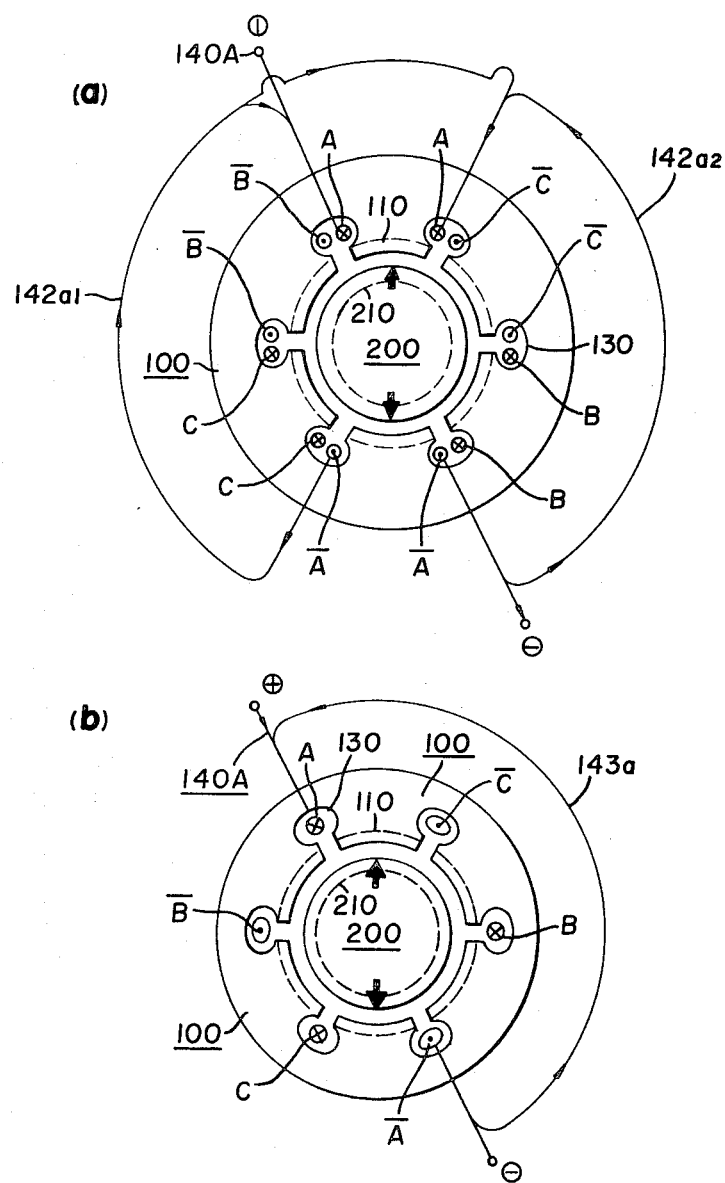

FIGS. 22(a) and (b) show methods of winding in the form of long-pitch unit coil; (a) is 120° pitch for intersecting two unit magnetic paths, and (b) is 180° pitch for intersecting three unit magnetic paths. In FIG. 22, the polarities of the winding conductor are indicated by $\otimes$ and $\odot$, and the windings A and $\bar{A}$ make up a pair, so as B and $\bar{B}$, and C and $\bar{C}$, thus forming unit coils respectively. These unit coils are of the windings of A, B and C phases respectively.

In the embodiment in FIG. 22, the flux of one unit magnetic path intersects windings of a plurality of phases. In other words, fluxes are produced across the gap of one unit magnetic path by the composite current (composite magneto-motive force) synthesized from currents (magnetomotive forces) of plural phases. Accordingly, the distribution of magnetic fields across the gap, i.e., the direction (rotation angle) of magnetic fields across the gap, is determined directly by the vector synthesis of currents of the respective phases. Thus the electrical vector rotation angle directly determines the driving force balance point. This is advantageous over the phase separation type (such as shown in FIG. 21, or the type of tandem connection across phases, or the type having magnetic paths respective for phases without connections across phases) in which the electrical vector rotation angle θ is once reflected on the torque produced for each phase and then the driving force balance point is determined indirectly as the composite torque balance. This advantage is enhanced because the construction of the invention has a plurality of kinds of magnetic teeth for each phase.

Figure 23:
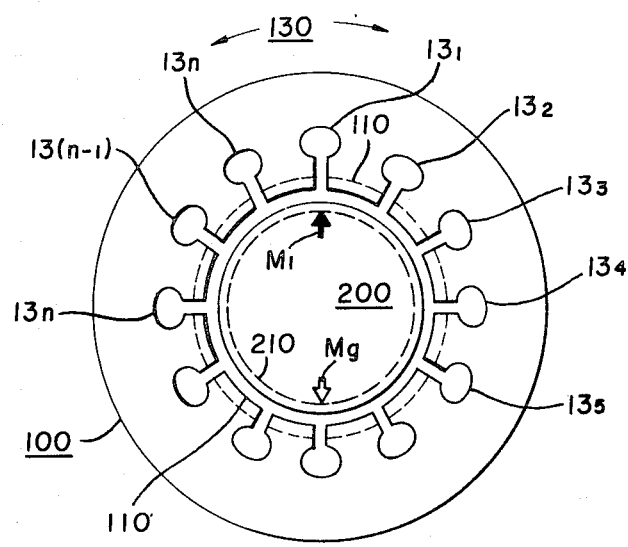
Figure 24:
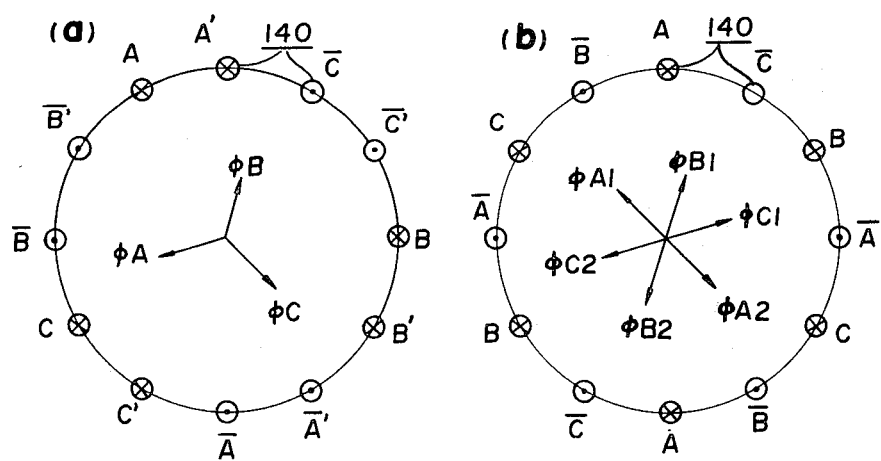

FIG. 23 shows a magnetic core pattern for a construction having a larger number of slots. The number of coincident points $M_1$ to $M_q$ for the magnetic teeth may be arbitrarily determined.

FIGS. 24(a) and (b) show methods of winding applied to the construction having 12 slots. FIG. 24(a) shows the construction of a 3-phase 2-pole 150° pitch winding in which the conductors indicated by alphabets with bars are paired to form unit coils respectively. FIG. 24(b) shows the construction of a 3-phase 4-pole 180° pitch winding. The 2-pole winding applies to the number of coincident points Q=2; and the 4-pole winding, to the number of coincident points q=4. For the construction having a field magnet, the 4-pole winding applies to the number of coincident points q=2. The greater the number of slots, the larger the number of unit coils and thus the smaller the distortion of the gap field distribution, and the better the vector composite effect by currents of individual phases synthesized in the direction (rotation angle) of the field across the gap.

FIGS. 25(a), (b) and (c) are diagrams showing the constructions of inductor type synchronous motors having a DC field magnet, in connection with DC field winding methods. FIG. 25(a) shows the construction of a bipolar type having slots 15 for even numbers of field windings 16. Driving winding (armature winding) slots $13_l$ to $13_n$ are installed between the slots. Often, the driving windings $14_l$ and $14_n$ are inserted in the field windings 16 for use in common with the slots. The driving windings $14_l$ to $14_n$ are wound so that a moving field (or moving current) is formed in part of the region between field winding slots with the electrical angle $2k_4$ ($k_4 = 1, 2, 3, \ldots$). The number (q) of tooth coincident points is $k_5k_4$ ($k_5:\frac{1}{2}$ of the number of field slots).

FIG. 25(b) shows the construction of a heteropolar type in which the field winding slots and the driving winding slots $13_l$ to $13_n$ can be used in common. The field windings 16 form magnetic poles N and S with one another. The driving windings $14_l$ to $14_n$ are wound in the same manner as in FIGS. 21 to 24. In this example, the number of winding poles is twice that in the case of the construction having no DC field magnet. (The number of winding poles does not mean the number of unit magnetic paths 120, but is the number of magnetic poles produced when current is fed to the winding of one phase in the case of polyphase winding construction). For instance, the arrangement shown in FIG. 25(b) is described in relation to the one shown in FIG. 21. The polarities of the driving windings a, b and c are inverted from $\bar{a}$, $\bar{b}$ and $\bar{c}$. That is, the forward polarity symbols a, b and c are given in place of the reverse polarity symbols $\bar{a}$, $\bar{b}$ and $\bar{c}$ for the driving windings.

FIG. 25(c) shows the construction of a dual pair homopolar type disclosed in Japan Patent Application No. 48-31627 (1973); a cross-sectional view across the plane including the rotation axis is illustrated. The field windings 16a and 16b are of doughnut type (ring type), and the pattern of inductor cores 100 and 200 is as shown in FIG. 23. The field flux passes through a loop: the first inductor $100_2$—gap—the second inductor $200_2$—the second inductor $200_1$—the first inductor $100_1$—the yoke 17, and also through the loop: the first inductor $100_2$—the second inductor $200_2$—the second inductor $200_3$—gap—the first inductor $100_3$—the yoke 17, whereby a radial field of unipolarity is formed across the gap.

Permanent magnets 16a′ and 16b′ may be installed instead of the field windings 16a and 16b. The driving winding 140 is wound in the form of polyphase winding as in FIG. 24(b). The number of polarities of the windings is made twice the number q of the coincident point M. For this arrangement, various methods of polyphase winding may be employed such as in connection with the number of slots made for each pole and each phase, and short-pitch winding.

Figure 7:
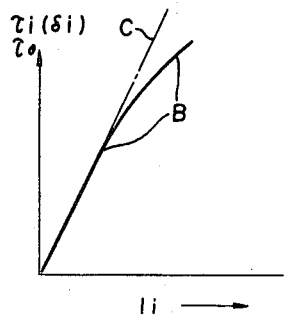
FIG. 7 is a current-to-torque characteristic curve diagram of a low-distortion inductor type synchronous motor having a DC field magnet suitable for the invention.

In the construction having a DC field magnet, the fluxes $\phi_1$ to $\phi_i$ are given uniformly by DC field means and expressed identically by the following equation:

$$\phi_i = K_6 I_f a_{si} \tag{13}$$

where $k_6$: constant, indicating a saturation characteristic dependent on $I_f$ $I_f$: field current Thus the produced torque is proportional to the driving winding current (when the field current $I_f$ is constant), having a proportional characteristic curve as in FIG. 7 even with magnetic saturation taken into consideration. It is desirable that the DC field is intensified and the driving winding magneto-motive force is reduced to improve the power factor. Therefore the produced torque comes in the range of proportional linearity. It is most desirable that control accuracy is determined in the range of good linearity.

Equation (11) is rewritten as follows, where $\Psi_0(I_f)$ exhibits a magnetization characteristic pattern of the straight line C or the saturation curve B as in FIG. 7.

$$\tau_{dc} = A_1 \cdot \Psi_0(I_f) \cdot I_1 m/2 S_{in}(\theta - \theta_m) \tag{14}$$

where $\tau_{dc}$: torque of DC exciting type motor

A motor of the reluctance type without DC field magnet has self-exciting characteristic, in which the value $I_E$ which corresponds to the excitation component $I_f$ is given by the following equation. (Although a strict operational result is supposed to be derived from the permeance and current distribution of each tooth, such operational approach is omitted for the sake of simplicity.)

$$I_E = I_1 m/2 \cos(\theta - \theta_m) \tag{15}$$

From Eq. (14), the reluctance motor torque $_R$ is given as $$\tau_R = A_1 \Psi_0(I_E) \cdot I_1 m/2 S_{in}(\theta - \theta_m) \tag{16}$$

where $\Psi_0(I_E)$ is a magnetic saturation curve as B in FIG. 7. In the linear proportional region, the torque $\Psi_R$ is $$\tau_R = 2K_R I_1{}^2 S_{in}(\theta - \theta_m) \cdot \cos(\theta - \theta_m) = K_R I_1{}^2 S_{in} 2(\theta - \theta_m) \tag{17}$$

where $K_R$ is a constant dependent on the proportional constant m of A, $\Psi_0(I_E)$.

Here the value $2(\theta - \theta_m)$ is the load angle $\delta_R$ of the reluctance type motor. In the magnetic saturation region, the value $\Psi_0(I_E)$ is saturated and the torque exhibits a current proportional characteristic.

As is apparent from Eqs. (16) and (17), the feed current vector rotation angle $\theta$ is accurately reflected on the driving force balance point $\theta_\tau$ and the electromagnetic balance point $\theta_m$. This principle originates from the condition allowing Eqs. (6) and (7) to be established, and depends on the accuracy with which whether or not the vector rotation angle can be expressed only by the first order component ($\nu = 1$) and reduced higher order component ($\nu \geq 2$). The key to this principle lies in Eqs. (4) and (5).

More specifically, it is essential that many kinds of first magnetic teeth having many kinds of degrees of coincidence (absolute value and varying factor and directivity, as well as phase and varying pattern) and having various permeance varying patterns and varying phases, have a flux intersecting relationship with the winding of one phase. Thus "distortivity" of magnetic teeth of a single kind is reduced and the ratio of the higher order component (distortion component) to the first order varying component (fundamental component) is reduced. Consequently, magnetic circuit distortion is reduced.

For instance, in the method of shifting the tooth phase $\zeta_{1i}$, two kinds of teeth are used and the phase difference between the two is set to $\pi/2$ whereby the second order component ($\nu = 2$) which is the greatest cause of error is eliminated. In another method, two kinds of teeth are used and the phase difference between the two is set to $\pi/3$ whereby the third order component which is the second greatest cause of error is eliminated. In another method, magnetic teeth of three phases $\zeta_{11}$, $\zeta_{12}$ and $\zeta_{13}$ are used to intersect fluxes in numbers $W_1$, $W_2$ and $W_3$ (or tooth widths $t_1$, $t_2$ and $t_3$) whereby a lower order ($\nu = 2, 3$ or $\nu = 2, 4$) component can be markedly reduced.

The higher order component ($\nu \geq 2$) can be greatly reduced when the phase $\zeta_{1i}$ is set to a distribution width $\pm \Delta \zeta = \pi/3$ to $\pi/4$, without the need for eliminating a specific order component. This is available by setting the coil pitch of the unit coil to an electrical angle of $2\pi/3$ to $\pi$ (for instance, one shown in FIGS. 22 and 24, or in FIG. 21 which has a DC field magnet).

The above can also be realized by the skew of the inductor teeth as in FIG. 19. In the construction in FIG. 16, the winding for one phase is made to intersect a plurality of unit magnetic paths whereby substantially numerous kinds of distributions can be obtained as in FIG. 19. Further, higher or lower order components can be markedly reduced by increasing the number of slots (FIG. 20) and thus increasing the kind of $W_i$.

In another method, the coil pitch is increased to allow unit magnetic paths and gaps to be used in common (polyphase distribution winding) whereby the difference between $\theta$ and $\theta_m$ can be eliminated. This point can be absolutely improved by emphasizing polyphase distribution, in addition to increasing the number of slots. Polyphase distribution winding (gap-common winding) as in FIGS. 22 and 24 offers a rotating field (moving field) where waves of field are uniformly moved or rotated, which rotates or moves in accurate correspondence to the vector rotation angle of the quantity of feed electricity. The gap field itself draws a locus as in FIG. 5.

By the above arrangement, a nondistortion electromagnetic construction (with higher harmonic components removed, and sinusoidalized internal velocity electromotive force) can be realized. The key to such nondistortion electromagnetic construction lies in that the fluxes of a plurality of kinds of magnetic teeth intersect the winding corresponding to one phase. Means to realize this effect include an arrangement for pitches of magnetic teeth, adjustment of tooth widths, skew, increase in the pitch of unit coils, increase in the number of winding slots, increase in the number of unit coils, and an approach to the distribution winding.

When power is supplied uniquely and trigonometrically in function to the inductor type synchronous motor of nondistortion construction realized in the foregoing manner, the electrical vector rotation angle $\theta$ of the feed power AC component becomes accurately coincident with the driving force balance point $\theta_T$. Thus highly accurate resolution control is realized by a very simple means (a feed power pattern generating means, i.e., a trigonometric function generator and a solid-state switch circuit operated as a power amplifier means). Furthermore, the current value I (total proportional representative value such as wave height value $I_j$) can be arbitrarily changed or suitably controlled such as, for instance, the current value I is made to correspond to a given torque or to an accelerating or decelerating speed, or changed at a predetermined time of operation.

I claim:

1. A system for driving an inductor-type synchronous motor for minute control comprising:

an inductor-type synchronous motor having a first means equipped with driving windings of m numbers of phases and first magnetic teeth, and second means equipped with second magnetic teeth face to face with said first magnetic teeth; and a power feed means for feeding electric power to said driving windings of said m numbers of phases from a DC power source through solid-state switching means interposed therebetween;

wherein said driving windings for one of said phases intersect flux of a portion of said first magnetic teeth and said portion includes at least two magnetic teeth having different fluxes in electrical phase which results in said first means forming a non-distortion electromagnetic construction thereby providing a sinusoidalized internal velocity electromotive force; and wherein said power feed means comprises a distribution pattern generator for generating patterns in response to a command signal from a system control means, and comprises a switching control device for generating on-off signals for on-off control of said solid-state switching means in response to said pattern; and said fed electric power being formed into trigonometric-functional patterns by said distribution pattern generator to provide AC components of said fed electric power which has an electric vector rotation angle which is accurately coincident with a balance point of magnetomotive force produced by said driving winding;

whereby minute control is provided which is characterized by an electrical resolution number per electrical angle $2\pi$ of said power feed means which is equal or larger than three times m points.

2. A system for driving an inductor type synchronous motor for minute control as in claim 1 wherein the flux of at least one of said first magnetic teeth interlinks the driving windings of a plurality of said m numbers of phases.

3. A system for driving an inductor type synchronous motor for minute control as in claim 1 wherein a composite of the magneto-motive force of said plural phases acts on a gap formed between a portion of said first and second teeth.

4. A system for driving an inductor type synchronous motor for minute control as in claim 1 wherein the magnetic teeth of one phase of said m numbers of phases comprises at least two magnetic teeth whose fluxes interlink said driving winding of one phase.

5. A system for driving an inductor type synchronous motor for minute control as in claim 1 wherein said first means has a group of unit magnetic paths for forming paths to said driving windings, the group of unit magnetic paths having a unit magnetic path divided by slots and which has a plurality of unit magnetic teeth installed opposite to second magnetic teeth, the unit magnetic teeth belonging to said first magnetic teeth, and said first means further has a group of unit coils intersecting the flux of at least one of said magnetic paths, and each phase of said driving windings is formed of at least one of said unit coils in series-parallel connection.

6. A system for driving an inductor type synchronous motor for minute control as in claim 5 wherein at least two magnetic teeth of one of said magnetic paths are different in kind from each other.

7. A system for driving an inductor type synchronous motor for minute control as in claim 5 wherein the driving winding of at least one phase intersects the fluxes of at least two unit magnetic paths and said portion of first magnetic teeth of one phase are installed on different unit magnetic paths.

8. A system for driving an inductor type synchronous motor for minute control as in claim 5 wherein the flux of at least one of said group of magnetic paths intersects said driving windings of plural phases.

9. A system for driving an inductor type synchronous motor for minute control as in claim 1 wherein pitch of said first magnetic teeth is differentiated from that of said second magnetic teeth on one of said unit magnetic paths.

10. A system for driving an inductor type synchronous motor for minute control as in claim 1 wherein either said group of first magnetic teeth or said second magnetic teeth are sequentially shifted in the direction perpendicular to a relative moving direction of the first and second magnetic teeth.

11. A system for driving an inductor type synchronous motor for minute control as in claim 1 wherein at least two of said first magnetic teeth have tooth widths different from each other.

12. A system for driving an inductor type synchronous motor for minute control as in claim 1 wherein a DC field means for providing a DC field is disposed between said first magnetic teeth and said second magnetic teeth whereby the linearity of a current-torque characteristic is improved.

13. A system for driving an inductor type synchronous motor for minute control as in claim 1 wherein said power feed means feeds current or applies voltages which are proportional to the currents or voltages of the driving windings of the m numbers of phases.

14. A system for driving an inductor type synchronous motor for minute control as in claim 1 including power control means for controlling said electric power accordingly to a desired torque.

15. A system for driving an inductor type synchronous motor for minute control as in claim 1 wherein said power feed means is a pure AC power feed device for bipolar power feed to the driving windings of the m numbers of phases.

16. A system for driving an inductor type synchronous motor for minute control as in claim 1 wherein said pattern generator forms said fed electric power into a trapezoidal wave or a polygonal-line-approximated sine wave or a pattern wave of time-ratio-modulated wave representing said trapezoidal wave or representing said polygonal-line approximated sine wave, and being unipolar or bipolar.

17. A system for driving an inductor type synchronous motor for minute control as in claim 16 wherein said fed power is bipolar.

18. A system for driving an inductor type synchronous motor for minute control as in claim 12 wherein said power feed means feeds power in a trigonometric functional mode in the low speed region for minute control, and releases minute control during operation in a high speed region.

19. A system for driving an inductor type synchronous motor for minute control as in claim 18 wherein said power feed means feeds a voltage or a current of the square wave or stepped wave type during operations in a high speed region.

20. A system for driving an inductor type synchronous motor for minute control as in claim 12 wherein said power feed means provides a switching mode control performing time-ratio-modulation, thus feeding said motor with voltage or current of sine wave or approximate sine wave, unipolar or bipolar wave.

21. A system for driving an inductor type synchronous motor for minute control as in claim 20 wherein said power feed means comprises: a distribution pattern generator for generating a waveform pattern in response to a digital command pulse from a digital command pulse generator, and said waveform pattern has the form of a trigonometric functional mode wave or approximately trigometric functional mode wave or said time-ratio-modulated wave representing the trigonometric or approximately-trigometric functional mode wave, and a power control device for generating an output of substantial power-amplified quantity of said waveform pattern.

22. A system for driving an inductor type synchronous motor for minute control as in claim 21 wherein said distribution pattern generator generates a time-ratio-modulated wave, and said time-ratio-modulated distribution pattern is an on-off control signal for on-off control of at least one of said solid-state switching means of said power feed means.

23. A system for driving an inductor type synchronous motor for minute control as in claim 21 wherein said distribution pattern generator has a frequency signal generator and a signal converter; the frequency signal generator being capable of generating at least two frequency signals, at least one of which is variable in frequency responding to said digital command pulse, and the signal converter receiving said two frequency signals and generating a distribution pattern.

24. A fine control system for driving an inductor type synchronous motor comprising:
an inductor type synchronous motor having a first inductor equipped with driving windings corresponding to m phases and a group of first magnetic teeth, and a second inductor equipped with a group of second magnetic teeth, m representing a positive interger;
a DC power supply;
a plurality of switches connected between the DC power supply and said driving winding for distributing the DC power supply voltage to said driving windings of said m phases, wherein said driving windings for one of said phases intersect flux of a portion of said first magnetic teeth and said portion includes at least two magnetic teeth having different fluxes in electrical phase which results in said first inductor forming a non-distortion electromagnetic construction thereby providing a sinusoitalized internal velocity electromotive force;
control means for generating command pulse trains which denote positive and negative rotation and fine control mode command pulse trains; and
distribution pattern generator means connected to said control means and responsive to the generation of a fine control mode command pulse train for controlling the on-off operation of said plurality of switches to cause a mean value of said supply voltage to said driving windings of said m phases to assume a trapezoidal waveform to provide AC components of said fed electric power which has an electric vector rotation angle which is accurately coincident with a balance point of magnetomotive force produced by said driving winding;
whereby minute control is provided which is characterized by an electrical resolution number per electrical angle $2\pi$ which is larger than 2 m.

25. A fine control system for driving an inductor type synchronous motor comprising:
an inductor type synchronous motor having a first phases and a group of first magnetic teeth, and a second inductor equipped with a group of second magnetic teeth, m representing a positive interger;
a DC power supply;
a plurality of switches connected between the DC power supply and said driving winding for distributing the DC power supply voltage to said driving winding of said m phases, wherein said driving windings for one of said phases intersect flux of a portion of said first magnetic teeth and said portion includes at least to magnetic teeth having different fluxes in electrical phase which results in said first inductor forming a non-distortion electromagnetic construction thereby providing a sinusoidalizer internal velocity electromotive force;
control means for generating command pulse trains which denote positive and negative rotation and fine control mode command pulse trains; and
distribution pattern generator means connected to said control means and responsive to the generation of a fine control mode command pulse train for controlling the on-off operation of said plurality of switches to cause a mean value of said supply voltage to said driving windings of said m phases to assume a square waveform to provide AC components of said fed electric power which has an electric vector rotation angle which is accurately coincident with a balance point of magnetomotive force produced by said driving windings;
whereby minute control is provided which is characterized by an electrical resolution number per electrical angle $2\pi$ which is larger than 2 m.

26. A fine control system for driving an inductor type synchronous motor comprising:
an inductor type synchronous motor having a first inductor equipped with driving winding corresponding to m phases and a group of first magnetic teeth, and a second inductor equipped with a group of second magnetic teeth, m representing a positive interger;
a DC power supply;
a plurality of switches connected between the DC power supply and said driving winding for distributing the DC power supply voltage to said driving winding of said m phases, wherein said driving windings for one of said phases intersect flux of a portion of said first magnetic teeth and said portion includes at least two magnetic teeth having different fluxes in electrical phase which results in said first inductor forming a non-distortion electromagnetic construction thereby providing a sinusoitalized internal velocity electromotive force;

control means for generating command pulse trains which denote positive and negative rotation and fine control mode command pulse trains; and distribution pattern generator means connected to said control means and responsive to the generation of a fine control mode command pulse train for controlling the on-off operation of said plurality of switches to cause a means current to said driving windings of said m phases to assume a trapezoidal waveform to provide AC components of fed electrical power which has an electric vector rotation angle which is accurately coincident with a balance point of magnetomotive force produced by said driving windings;

whereby minute control is provided which is characterized by an electrical resolution number per electrical angle $2\pi$ which is larger than 2 m.

27. A fine control system for driving an inductor type synchronous motor comprising:

an inductor type synchronous motor having a first inductor equipped with driving winding corresponding to m phases and a group of first magnetic teeth, and a second inductor equipped with a group of second magnetic teeth, m representing a positive interger;

a DC power supply;

a plurality of switches connected between the DC power supply the said driving winding for distributing the DC power supply voltage to said driving windings of said m phases, wherein said driving windings for one of said phases intersect flux of a portion of said first magnetic teeth and said portion includes at least two magnetic teeth having different fluxes in electrical phase which results in said first inductor forming a non-distortion electromagnetic construction thereby providing a sinusoidalized internal velocity electromotive force;

control means for generating command pulse trains which denote positive and negative rotation and fine control mode command pulse trains; and distribution pattern generator means connected to said control means and responsive to the generation of a fine control mode command pulse train for controlling the on-off operation of said plurality of switches to cause a mean value of mean current to said driving winding of said m phases to assume a polygonal line approximation sign waveform to provide AC components of said fed electrical power which has an electric vector rotation angle which is accurately coincident with a balance point of magnetomotive force produced by said driving windings;

whereby minute control is provided which is characterized by an electrical resolution number per electrical angle $2\pi$ which is larger than 2 m.

* * * * *